United States Patent
Bermudez et al.

(10) Patent No.: US 10,674,681 B2
(45) Date of Patent: Jun. 9, 2020

(54) BLOWER/VACUUM

(71) Applicant: MTD PRODUCTS INC, Valley City, OH (US)

(72) Inventors: Robert Bermudez, Gilbert, AZ (US); John Payne, Mesa, AZ (US)

(73) Assignee: MTD PRODUCTS INC, Valley City, OH (US)

( * ) Notice: Subject to any disclaimer, the term of this patent is extended or adjusted under 35 U.S.C. 154(b) by 354 days.

(21) Appl. No.: 15/609,582

(22) Filed: May 31, 2017

(65) Prior Publication Data

US 2017/0258013 A1   Sep. 14, 2017

Related U.S. Application Data

(63) Continuation of application No. 14/962,687, filed on Dec. 8, 2015.

(60) Provisional application No. 62/089,572, filed on Dec. 9, 2014.

(51) Int. Cl.
| | |
|---|---|
| *A47L 5/14* | (2006.01) |
| *A01G 20/43* | (2018.01) |
| *A01G 20/47* | (2018.01) |

(52) U.S. Cl.
CPC .............. *A01G 20/43* (2018.02); *A01G 20/47* (2018.02); *A47L 5/14* (2013.01)

(58) Field of Classification Search
CPC ............ A01G 20/43; A01G 20/47; A47L 5/14
USPC ................................. 15/327.5, 330, 405, 412
See application file for complete search history.

(56) References Cited

U.S. PATENT DOCUMENTS

| | | | |
|---|---|---|---|
| 4,076,460 | A | 2/1978 | Roof |
| 4,090,813 | A | 5/1978 | Minato |
| 4,152,094 | A | 5/1979 | Honda |
| 4,231,706 | A | 11/1980 | Ueda |
| 4,412,781 | A | 11/1983 | Abe |
| 4,432,694 | A | 2/1984 | Kuroda |
| 4,644,606 | A | 2/1987 | Luerken |
| 4,647,271 | A | 3/1987 | Nagai |
| 4,718,140 | A | 1/1988 | Johnson |

(Continued)

FOREIGN PATENT DOCUMENTS

| | | |
|---|---|---|
| EP | 0198654 | 10/1986 |
| EP | 0792578 | 9/1997 |

(Continued)

OTHER PUBLICATIONS

Metropolitan Vacuum, Datavac.

*Primary Examiner* — David Redding
(74) *Attorney, Agent, or Firm* — Wegman Hessler

(57) ABSTRACT

A blower including a base having a housing, a handle extending from the housing, a power source positioned within the housing, the blower including: a drive shaft extending forwardly from the power source, wherein the drive shaft is rotatable by the power source; a fan member operatively connected to the drive shaft; a flywheel extending rearwardly from the power source, the flywheel being positioned adjacent to a rear of the housing; and at least one rear vent formed into the rear of the housing adjacent to the flywheel, wherein rotation of the flywheel draws ambient air into the housing through the at least one rear vent, and rotation of the flywheel generates a cooling air flow that directs the ambient air across the power source to cool the power source during operation thereof.

14 Claims, 12 Drawing Sheets

(56) References Cited

U.S. PATENT DOCUMENTS

| | | | |
|---|---|---|---|
| 4,767,285 A | 8/1988 | Jyoraku | |
| 4,829,625 A | 5/1989 | Wang | |
| RE33,050 E * | 9/1989 | Tuggle | A47L 5/14 |
| | | | 15/330 |
| 5,035,586 A | 7/1991 | Sadler | |
| 5,233,946 A | 8/1993 | Yamami | |
| 5,267,371 A | 12/1993 | Soler | |
| 5,269,665 A * | 12/1993 | Sadler | A47L 5/14 |
| | | | 123/198 E |
| 5,281,083 A | 1/1994 | Ito | |
| 5,395,210 A | 3/1995 | Yamazaki | |
| 5,487,639 A | 1/1996 | Asabuki | |
| 5,533,869 A | 7/1996 | Garrison | |
| 5,536,139 A | 7/1996 | Yamazaki | |
| 5,569,023 A | 10/1996 | Ishida | |
| 5,588,178 A | 12/1996 | Liu | |
| 5,600,886 A | 2/1997 | Asabuki | |
| 5,628,615 A | 5/1997 | Asabuki | |
| 5,709,531 A | 1/1998 | Nishida | |
| 5,894,630 A | 4/1999 | Bitner | |
| 6,116,864 A * | 9/2000 | Veser | A47L 5/14 |
| | | | 417/364 |
| 6,141,823 A | 11/2000 | Fujiwara | |
| 6,141,824 A | 11/2000 | Fujiwara | |
| 6,146,094 A | 11/2000 | Obana | |
| 6,368,076 B1 | 4/2002 | Zoland | |
| 6,386,196 B1 | 5/2002 | Culton | |
| 6,442,790 B1 | 9/2002 | Svoboda | |
| 6,488,475 B2 | 12/2002 | Murata | |
| 6,503,065 B2 | 1/2003 | Tanaka | |
| 6,547,856 B2 | 4/2003 | Cartellone | |
| 6,629,818 B2 | 10/2003 | Svoboda | |
| 6,735,813 B2 | 5/2004 | Oohama | |
| 6,873,525 B2 | 3/2005 | Minamitani | |
| 6,874,694 B2 | 4/2005 | Saitoh | |
| 6,889,619 B2 | 5/2005 | Okazaki | |
| 6,890,673 B2 | 5/2005 | Higashiyama | |
| 6,900,555 B2 | 5/2005 | Sakamoto | |
| 6,900,875 B2 | 5/2005 | Nakano | |
| 6,907,891 B2 | 6/2005 | Anazawa | |
| 6,938,560 B2 | 9/2005 | Okazaki | |
| 6,948,336 B2 | 9/2005 | Fujita | |
| 6,948,552 B2 | 9/2005 | Kosugi | |
| 6,960,128 B2 | 11/2005 | Honda | |
| 6,964,709 B2 | 11/2005 | Matsumoto | |
| 6,972,954 B2 | 12/2005 | Minamitani | |
| 6,976,440 B2 | 12/2005 | Ohtani | |
| 6,987,668 B2 | 1/2006 | Kitano | |
| 7,005,053 B2 | 2/2006 | Yamazaki | |
| 7,020,306 B2 | 3/2006 | Hirose | |
| 7,022,151 B2 | 4/2006 | Ono | |
| 7,028,534 B2 | 4/2006 | Watanabe | |
| 7,028,819 B2 | 4/2006 | Saito | |
| 7,039,454 B1 | 5/2006 | Kaga | |
| 7,044,090 B2 | 5/2006 | Ohtsu | |
| 7,046,470 B2 | 5/2006 | Yamanashi | |
| 7,048,173 B2 | 5/2006 | Nakatsuka | |
| 7,048,626 B2 | 5/2006 | Honda | |
| 7,052,389 B2 | 5/2006 | Honda | |
| 7,076,339 B2 | 7/2006 | Yabutani | |
| 7,090,709 B2 | 8/2006 | Ono | |
| 7,103,979 B2 | 9/2006 | Yoshida | |
| 7,107,669 B2 | 9/2006 | Tanaka | |
| 7,121,253 B2 | 10/2006 | Shiraishi | |
| 7,128,882 B2 | 10/2006 | Tamata | |
| 7,141,221 B2 | 11/2006 | Irie | |
| 7,152,978 B2 | 12/2006 | Konuma | |
| 7,159,533 B1 | 1/2007 | Redd | |
| 7,165,418 B2 | 1/2007 | Mabuchi | |
| 7,168,374 B2 | 1/2007 | Okazaki | |
| 7,186,794 B2 | 3/2007 | Goto | |
| 7,207,083 B2 | 4/2007 | Hayashi | |
| 7,213,522 B2 | 5/2007 | Okazaki | |
| 7,219,435 B2 | 5/2007 | Yoshida | |
| 7,225,171 B2 | 5/2007 | Kikuchi | |
| 7,234,646 B2 | 6/2007 | Saitoh | |
| 7,242,580 B1 | 7/2007 | Tanaka | |
| 7,246,498 B2 | 7/2007 | Fujita | |
| 7,247,958 B2 | 7/2007 | Iwashige | |
| 7,261,071 B2 | 8/2007 | Ohtsu | |
| 7,261,868 B2 | 8/2007 | Kanno | |
| 7,276,099 B2 | 10/2007 | Hayashi | |
| 7,285,250 B2 | 10/2007 | Kanno | |
| 7,293,878 B2 | 11/2007 | Morita | |
| 7,294,315 B1 | 11/2007 | Kanno | |
| 7,308,409 B2 | 12/2007 | Tamata | |
| 7,320,641 B2 | 1/2008 | Luciano, Jr. | |
| 7,323,026 B2 | 1/2008 | Ono | |
| 7,370,623 B1 | 5/2008 | Solinski | |
| 7,371,808 B2 | 5/2008 | Goto | |
| 7,372,561 B2 | 5/2008 | Shibata | |
| 7,392,752 B2 | 7/2008 | Okazaki | |
| 7,394,081 B2 | 7/2008 | Okazaki | |
| 7,407,579 B2 | 8/2008 | Sumino | |
| 7,416,471 B2 | 8/2008 | Shimizu | |
| 7,425,267 B2 | 9/2008 | Sumino | |
| 7,437,882 B2 | 10/2008 | Matsunaga | |
| 7,448,825 B2 | 11/2008 | Kasahara | |
| 7,457,112 B2 | 11/2008 | Fukuda | |
| 7,465,215 B2 | 12/2008 | Shimizu | |
| 7,470,104 B2 | 12/2008 | Ishikawa | |
| 7,472,847 B2 | 1/2009 | Mukai | |
| 7,478,613 B2 | 1/2009 | Gunnarsson | |
| 7,488,949 B2 | 2/2009 | Ueno | |
| 7,494,941 B2 | 2/2009 | Kasahara | |
| 7,504,720 B2 | 3/2009 | Nakatsu | |
| 7,511,277 B2 | 3/2009 | Ueno | |
| 7,516,553 B2 | 4/2009 | Yoshida | |
| 7,521,011 B2 | 4/2009 | Ishikawara | |
| 7,530,305 B2 | 5/2009 | Toyoda | |
| 7,537,698 B2 | 5/2009 | Sumino | |
| 7,540,722 B2 | 6/2009 | Nishikawa | |
| 7,540,959 B2 | 6/2009 | Sumino | |
| 7,543,769 B2 | 6/2009 | Shimizu | |
| 7,550,082 B2 | 6/2009 | Sumino | |
| 7,550,083 B2 | 6/2009 | Sumino | |
| 7,551,436 B2 | 6/2009 | Hata | |
| 7,553,153 B2 | 6/2009 | Okazaki | |
| 7,553,572 B2 | 6/2009 | Komachiya | |
| 7,559,742 B2 | 7/2009 | Inoue | |
| 7,569,617 B2 | 8/2009 | Mukaide | |
| 7,575,679 B2 | 8/2009 | Sumino | |
| 7,591,709 B2 | 9/2009 | Shimizu | |
| 7,599,545 B2 | 10/2009 | Shibata | |
| 7,601,252 B2 | 10/2009 | Yamazaki | |
| 7,601,317 B2 | 10/2009 | Orita | |
| 7,609,477 B2 | 10/2009 | Atarashi | |
| 7,611,676 B2 | 11/2009 | Inage | |
| 7,619,385 B2 | 11/2009 | Suzuki | |
| 7,622,010 B2 | 11/2009 | Kuniyoshi | |
| 7,641,867 B2 | 1/2010 | Irie | |
| 7,641,877 B2 | 1/2010 | Maekawa | |
| 7,651,249 B2 | 1/2010 | Ohashi | |
| 7,654,396 B2 | 2/2010 | Takeno | |
| 7,658,078 B2 | 2/2010 | Nishida | |
| 7,658,890 B2 | 2/2010 | Kokun | |
| 7,662,295 B2 | 2/2010 | Arato | |
| 7,665,408 B2 | 2/2010 | Okazaki | |
| 7,666,365 B2 | 2/2010 | Kokun | |
| 7,667,803 B2 | 2/2010 | Kobayashi | |
| 7,678,486 B2 | 3/2010 | Yamauchi | |
| 7,685,816 B2 | 3/2010 | Yabuki | |
| 7,700,054 B2 | 4/2010 | Hayashida | |
| 7,707,816 B2 | 5/2010 | Takahashi | |
| 7,707,837 B2 | 5/2010 | Inui | |
| 7,712,576 B2 | 5/2010 | Goto | |
| 7,722,844 B2 | 5/2010 | Nakagawa | |
| 7,724,515 B2 | 5/2010 | Fukuda | |
| 7,727,780 B2 | 6/2010 | Sugishita | |
| 7,730,713 B2 | 6/2010 | Nakano | |
| 7,731,926 B2 | 6/2010 | Oda | |
| 7,745,952 B2 | 6/2010 | Nakatsu | |
| 7,748,078 B2 | 7/2010 | Andriolo | |
| 7,758,326 B2 | 7/2010 | Fujimura | |

(56) References Cited

U.S. PATENT DOCUMENTS

| | | |
|---|---|---|
| 7,767,124 B2 | 8/2010 | Goto |
| 7,770,528 B2 | 8/2010 | Okazaki |
| 7,776,141 B2 | 8/2010 | Wu |
| 7,778,694 B2 | 8/2010 | Kaga |
| 7,806,649 B2 | 10/2010 | Ishikawa |
| 7,816,786 B2 | 10/2010 | Nakatsu |
| 7,819,935 B2 | 10/2010 | Austin, Jr. |
| 7,820,118 B2 | 10/2010 | Yamazaki |
| 7,826,217 B2 | 11/2010 | Kondo |
| 7,836,712 B2 | 11/2010 | Sasao |
| 7,839,113 B2 | 11/2010 | Maeda |
| 7,841,434 B2 | 11/2010 | Shimada |
| 7,843,525 B2 | 11/2010 | Tsumura |
| 7,846,568 B2 | 12/2010 | Norimatsu |
| 7,855,032 B2 | 12/2010 | Kamo |
| 7,855,890 B2 | 12/2010 | Kashirajima |
| 7,859,834 B2 | 12/2010 | Fukuda |
| 7,863,204 B2 | 1/2011 | Miyata |
| 7,863,904 B2 | 1/2011 | Takeda |
| 7,865,070 B2 | 1/2011 | Nakamura |
| 7,870,640 B2 | 1/2011 | Hinklin |
| 7,878,130 B2 | 2/2011 | Yamamoto |
| 7,887,289 B2 | 2/2011 | Tokunaga |
| 7,898,128 B2 | 3/2011 | Hattori |
| 7,900,996 B2 | 3/2011 | Kimura |
| 7,913,507 B2 | 3/2011 | Kondo |
| 7,922,480 B2 | 4/2011 | Kiyama |
| 7,922,518 B1 | 4/2011 | Takehara |
| 7,925,028 B2 | 4/2011 | Yokoyama |
| 7,926,288 B2 | 4/2011 | Yokota |
| 7,931,756 B2 | 4/2011 | Kuniyoshi |
| 7,954,460 B2 | 6/2011 | Kimura |
| 7,955,991 B2 | 6/2011 | Suzaki |
| 7,966,727 B2 | 6/2011 | Kawashima |
| 7,972,979 B2 | 7/2011 | Harada |
| 7,976,622 B2 | 7/2011 | Oda |
| 8,012,327 B2 | 9/2011 | Yamazaki |
| 8,014,096 B2 | 9/2011 | Huang |
| 8,033,714 B2 | 10/2011 | Nishioka |
| 8,033,783 B2 | 10/2011 | Ishikawa |
| 8,035,330 B2 | 10/2011 | Maeda |
| 8,035,522 B2 | 10/2011 | Oroku |
| 8,036,806 B2 | 10/2011 | Nakamura |
| 8,038,391 B2 | 10/2011 | Ishikawa |
| 8,042,876 B2 | 10/2011 | Tamura |
| 8,047,145 B2 | 11/2011 | Gretta |
| 8,049,378 B2 | 11/2011 | Hattori |
| 8,058,842 B2 | 11/2011 | Kai |
| 8,074,765 B2 | 12/2011 | Goto |
| 8,091,888 B2 | 1/2012 | Tamamoto |
| 8,092,582 B2 | 1/2012 | Ueda |
| 8,095,479 B2 | 1/2012 | Sekiai |
| 8,103,401 B2 | 1/2012 | Kubo |
| 8,104,842 B2 | 1/2012 | Fushiki |
| 8,105,540 B2 | 1/2012 | Goto |
| 8,116,618 B2 | 2/2012 | Hayashida |
| 8,137,856 B2 | 3/2012 | Yamaga |
| 8,147,941 B2 | 4/2012 | Anzai |
| 8,158,911 B2 | 4/2012 | Hayashida |
| 8,159,184 B2 | 4/2012 | Emori |
| 8,159,622 B2 | 4/2012 | Tanaka |
| 8,163,052 B2 | 4/2012 | Ono |
| 8,172,931 B2 | 5/2012 | Ueda |
| 8,172,950 B2 | 5/2012 | Yanagisawa |
| 8,173,313 B2 | 5/2012 | Nishimura |
| 8,178,019 B2 | 5/2012 | Aramaki |
| 8,182,610 B2 | 5/2012 | Takahara |
| 8,192,970 B2 | 6/2012 | Sumino |
| 8,199,504 B2 | 6/2012 | Kashirajima |
| 8,207,704 B2 | 6/2012 | Kai |
| 8,212,571 B2 | 7/2012 | Emori |
| 8,230,828 B2 | 7/2012 | Yoshino |
| 8,231,731 B2 | 7/2012 | Suzuki |
| 8,231,851 B2 | 7/2012 | Irie |
| 8,245,749 B2 | 8/2012 | Imai |
| 8,246,803 B2 | 8/2012 | Yamazaki |
| 8,251,298 B2 | 8/2012 | Tatehira |
| 8,251,644 B2 | 8/2012 | Wada |
| 8,257,044 B2 | 9/2012 | Hayasaka |
| 8,262,370 B2 | 9/2012 | Kaagebaeck |
| 8,264,204 B2 | 9/2012 | Nagaoka |
| 8,279,359 B2 | 10/2012 | Tanaka |
| 8,293,109 B2 | 10/2012 | Kimura |
| 8,297,921 B2 | 10/2012 | Tokunaga |
| 8,303,817 B2 | 11/2012 | Isaka |
| 8,313,290 B2 | 11/2012 | Tanaka |
| 8,337,779 B2 | 12/2012 | Miyashita |
| 8,338,050 B2 | 12/2012 | Suzuki |
| 8,338,997 B2 | 12/2012 | Nishikawa |
| 8,342,782 B2 | 1/2013 | Nishikawa |
| 8,344,332 B2 | 1/2013 | Eguchi |
| 8,359,704 B2 | 1/2013 | Yamazaki |
| 8,360,016 B2 | 1/2013 | Wada |
| 8,382,873 B2 | 2/2013 | Ono |
| 8,388,845 B2 | 3/2013 | Isaka |
| 8,392,756 B2 | 3/2013 | Nakayama |
| 8,393,065 B2 | 3/2013 | Tatsumi |
| 8,401,728 B2 | 3/2013 | Kubo |
| 8,416,571 B2 | 4/2013 | Mizumura |
| 8,423,111 B2 | 4/2013 | Fujiwara |
| 8,426,047 B2 | 4/2013 | Emori |
| 8,439,005 B2 | 5/2013 | Yasutomi |
| 8,459,932 B2 | 6/2013 | Nakano |
| 8,481,434 B2 | 7/2013 | Miya |
| 8,485,811 B2 | 7/2013 | Shimao |
| 8,496,742 B2 | 7/2013 | Konishi |
| 8,499,730 B2 | 8/2013 | Yasutomi |
| 8,500,912 B2 | 8/2013 | Hirota |
| 8,501,599 B2 | 8/2013 | Ueno |
| 8,507,296 B2 | 8/2013 | Ueno |
| 8,511,258 B2 | 8/2013 | Yamamoto |
| 8,518,570 B2 | 8/2013 | Kudo |
| 8,525,120 B2 | 9/2013 | Iwamoto |
| 8,529,169 B2 | 9/2013 | Nishikawa |
| 8,536,809 B2 | 9/2013 | Kojima |
| 8,540,042 B2 | 9/2013 | Atarashi |
| 8,545,686 B2 | 10/2013 | Inaba |
| 8,550,043 B2 | 10/2013 | Naganuma |
| 8,572,430 B2 | 10/2013 | Nakamura |
| 8,580,039 B2 | 11/2013 | Saeki |
| 8,591,194 B2 | 11/2013 | Hayasaka |
| 8,616,619 B2 | 12/2013 | Kimura |
| 8,636,882 B2 | 1/2014 | Suzuki |
| 8,637,199 B2 | 1/2014 | Nishimura |
| 8,721,298 B2 | 5/2014 | Tanimoto |
| 2001/0008439 A1 | 7/2001 | Konuma |
| 2001/0015194 A1 | 8/2001 | Shiraishi |
| 2001/0028241 A1 | 10/2001 | Saito |
| 2001/0054847 A1 | 12/2001 | Yoshida |
| 2002/0043964 A1 | 4/2002 | Saito |
| 2002/0092508 A1 | 7/2002 | Kanekawa |
| 2002/0100791 A1 | 8/2002 | Mukuno |
| 2002/0112924 A1 | 8/2002 | Mori |
| 2002/0113492 A1 | 8/2002 | Sakamoto |
| 2002/0122750 A1 | 9/2002 | Kanno |
| 2002/0131913 A1 | 9/2002 | Tamata |
| 2002/0144671 A1 | 10/2002 | Shiraishi |
| 2002/0170432 A1 | 11/2002 | Cartellone |
| 2003/0001434 A1 | 1/2003 | Saito |
| 2003/0004391 A1 | 1/2003 | Anazawa |
| 2003/0019585 A1 | 1/2003 | Tometsuka |
| 2003/0098211 A1 | 5/2003 | Saito |
| 2003/0116352 A1 | 6/2003 | Nakatsuka |
| 2003/0131895 A1 | 7/2003 | Mitomo |
| 2003/0133760 A1 | 7/2003 | Fukushima |
| 2003/0133761 A1 | 7/2003 | Fukushima |
| 2003/0147769 A1 | 8/2003 | Kiyotoki |
| 2003/0172646 A1 | 9/2003 | Hiratsuka |
| 2003/0180175 A1 | 9/2003 | Kiyotoki |
| 2003/0206276 A1 | 11/2003 | Konuma |
| 2003/0231898 A1 | 12/2003 | Asaoka |
| 2004/0025852 A1 | 2/2004 | Kanekawa |
| 2004/0032563 A1 | 2/2004 | Nakasu |
| 2004/0065096 A1 | 4/2004 | Sakuma |

(56) References Cited

U.S. PATENT DOCUMENTS

| | | |
|---|---|---|
| 2004/0112119 A1 | 6/2004 | Watanabe |
| 2004/0159721 A1 | 8/2004 | Shiraishi |
| 2004/0165909 A1 | 8/2004 | Asaoka |
| 2004/0211345 A1 | 10/2004 | Okazaki |
| 2005/0014989 A1 | 1/2005 | Anazawa |
| 2005/0074656 A1 | 4/2005 | Koyama |
| 2005/0079392 A1 | 4/2005 | Norimatsu |
| 2005/0083490 A1 | 4/2005 | Konuma |
| 2005/0089461 A1 | 4/2005 | Kanno |
| 2005/0089734 A1 | 4/2005 | Norimatsu |
| 2005/0092220 A1 | 5/2005 | Okazaki |
| 2005/0114876 A1 | 5/2005 | Atarashi |
| 2005/0168072 A1 | 8/2005 | Saito |
| 2005/0208358 A1 | 9/2005 | Nishimura |
| 2005/0241100 A1 | 11/2005 | Park |
| 2005/0242276 A1 | 11/2005 | Okazaki |
| 2005/0242464 A1 | 11/2005 | Goto |
| 2005/0254941 A1 | 11/2005 | Inoue |
| 2005/0257721 A1 | 11/2005 | Okazaki |
| 2005/0261470 A1 | 11/2005 | Goto |
| 2006/0017188 A1 | 1/2006 | Ishikawara |
| 2006/0091073 A1 | 5/2006 | Sumino |
| 2006/0096863 A1 | 5/2006 | Yamazaki |
| 2006/0096915 A1 | 5/2006 | Sumino |
| 2006/0115779 A1 | 6/2006 | Yamamoto |
| 2006/0122793 A1 | 6/2006 | Tamata |
| 2006/0191846 A1 | 8/2006 | Sumino |
| 2006/0232942 A1 | 10/2006 | Nakatsu |
| 2006/0243427 A1 | 11/2006 | Kitajima |
| 2006/0245296 A1 | 11/2006 | Nishioka |
| 2007/0026356 A1 | 2/2007 | Okazaki |
| 2007/0032045 A1 | 2/2007 | Kasahara |
| 2007/0053154 A1 | 3/2007 | Fukuda |
| 2007/0079736 A1 | 4/2007 | Okazaki |
| 2007/0089295 A1 | 4/2007 | Kawashima |
| 2007/0089296 A1 | 4/2007 | Tatehira |
| 2007/0092847 A1 | 4/2007 | Okazaki |
| 2007/0096278 A1 | 5/2007 | Nakatsu |
| 2007/0110837 A1 | 5/2007 | Goto |
| 2007/0122235 A1 | 5/2007 | Kasahara |
| 2007/0163882 A1 | 7/2007 | Yamazaki |
| 2007/0170063 A1 | 7/2007 | Yamazaki |
| 2007/0205677 A1 | 9/2007 | Iwashige |
| 2007/0218808 A1 | 9/2007 | Shimizu |
| 2007/0218809 A1 | 9/2007 | Shimizu |
| 2007/0218816 A1 | 9/2007 | Shimizu |
| 2007/0227789 A1 | 10/2007 | Imura |
| 2007/0259532 A1 | 11/2007 | Suzaki |
| 2007/0283701 A1 | 12/2007 | Yokota |
| 2008/0023401 A1 | 1/2008 | Arato |
| 2008/0050645 A1 | 2/2008 | Kai |
| 2008/0070486 A1 | 3/2008 | Shimizu |
| 2008/0105204 A1 | 5/2008 | Nakada |
| 2008/0153314 A1 | 6/2008 | Hayashida |
| 2008/0164187 A1 | 7/2008 | Sumino |
| 2008/0164196 A1 | 7/2008 | Sumino |
| 2008/0182345 A1 | 7/2008 | Sugishita |
| 2008/0199378 A1 | 8/2008 | Orita |
| 2008/0209671 A1 | 9/2008 | Conrad |
| 2008/0230305 A1 | 9/2008 | Goto |
| 2008/0259563 A1 | 10/2008 | Fukuda |
| 2008/0267598 A1 | 10/2008 | Nakamura |
| 2008/0284375 A1 | 11/2008 | Nagaoka |
| 2008/0285290 A1 | 11/2008 | Ohashi |
| 2008/0286846 A1 | 11/2008 | Sumino |
| 2008/0288217 A1 | 11/2008 | Akao |
| 2008/0302505 A1 | 12/2008 | Kato |
| 2008/0311016 A1 | 12/2008 | Maekawa |
| 2009/0008313 A1 | 1/2009 | Sumino |
| 2009/0011606 A1 | 1/2009 | Shinozaki |
| 2009/0014428 A1 | 1/2009 | Hayashida |
| 2009/0014435 A1 | 1/2009 | Hayashida |
| 2009/0016706 A1 | 1/2009 | Hayashida |
| 2009/0017251 A1 | 1/2009 | Anzai |
| 2009/0017641 A1 | 1/2009 | Yanagisawa |
| 2009/0029486 A1 | 1/2009 | Ueno |
| 2009/0035948 A1 | 2/2009 | Miyata |
| 2009/0085516 A1 | 4/2009 | Emori |
| 2009/0087722 A1 | 4/2009 | Sakabe |
| 2009/0087805 A1 | 4/2009 | Ochi |
| 2009/0091332 A1 | 4/2009 | Emori |
| 2009/0091883 A1 | 4/2009 | Fukuda |
| 2009/0095422 A1 | 4/2009 | Sugishita |
| 2009/0100905 A1 | 4/2009 | Tamata |
| 2009/0111285 A1 | 4/2009 | Yamazaki |
| 2009/0115919 A1 | 5/2009 | Tanaka |
| 2009/0130541 A1 | 5/2009 | Emori |
| 2009/0130860 A1 | 5/2009 | Miya |
| 2009/0148246 A1 | 6/2009 | Nishikawa |
| 2009/0148248 A1 | 6/2009 | Nishikawa |
| 2009/0149032 A1 | 6/2009 | Kameda |
| 2009/0151309 A1 | 6/2009 | Austin, Jr. |
| 2009/0160048 A1 | 6/2009 | Nakatsu |
| 2009/0170328 A1 | 7/2009 | Kameda |
| 2009/0173234 A1 | 7/2009 | Ueda |
| 2009/0197352 A1 | 8/2009 | Ueno |
| 2009/0198399 A1 | 8/2009 | Kubo |
| 2009/0201645 A1 | 8/2009 | Kashirajima |
| 2009/0220401 A1 | 9/2009 | Nakagawa |
| 2009/0228187 A1 | 9/2009 | Nakamura |
| 2009/0263305 A1 | 10/2009 | Oda |
| 2009/0277334 A1 | 11/2009 | Oda |
| 2009/0317248 A1 | 12/2009 | Tanaka |
| 2009/0320687 A1 | 12/2009 | Ueda |
| 2010/0001573 A1 | 1/2010 | Fushiki |
| 2010/0001737 A1 | 1/2010 | Kubo |
| 2010/0021335 A1 | 1/2010 | Kuniyoshi |
| 2010/0033695 A1 | 2/2010 | Kanno |
| 2010/0037875 A1 | 2/2010 | Yasutomi |
| 2010/0037877 A1 | 2/2010 | Yasutomi |
| 2010/0077925 A1 | 4/2010 | Konishi |
| 2010/0102594 A1 | 4/2010 | Kimura |
| 2010/0123359 A1 | 5/2010 | Nishikawa |
| 2010/0154711 A1 | 6/2010 | Ishibashi |
| 2010/0187037 A1 | 7/2010 | Goto |
| 2010/0209748 A1 | 8/2010 | Kudo |
| 2010/0209803 A1 | 8/2010 | Yamaga |
| 2010/0223926 A1 | 9/2010 | Orita |
| 2010/0230348 A1 | 9/2010 | Isaka |
| 2010/0236082 A1 | 9/2010 | Naganuma |
| 2010/0243562 A1 | 9/2010 | Kimura |
| 2010/0243565 A1 | 9/2010 | Isaka |
| 2010/0260881 A1 | 10/2010 | Goto |
| 2010/0269741 A1 | 10/2010 | Okazaki |
| 2010/0281862 A1 | 11/2010 | Shiraishi |
| 2010/0291448 A1 | 11/2010 | Yamaga |
| 2010/0303658 A1 | 12/2010 | Ito |
| 2011/0048454 A1 | 3/2011 | Saeki |
| 2011/0094051 A1 | 4/2011 | Gripske |
| 2012/0073080 A1 | 3/2012 | Yokoyama |
| 2013/0017078 A1 | 1/2013 | Armstrong |
| 2013/0091812 A1 | 4/2013 | Smith |
| 2013/0125339 A1 | 5/2013 | Yokote |
| 2013/0185892 A1 | 7/2013 | Walker |
| 2013/0212830 A1 | 8/2013 | Stones |
| 2013/0276260 A1 | 10/2013 | Osterchill |
| 2014/0049204 A1 | 2/2014 | Ito |
| 2014/0050600 A1 | 2/2014 | Kodato |

FOREIGN PATENT DOCUMENTS

| | | |
|---|---|---|
| EP | 0922429 | 6/1999 |
| EP | 1591052 | 11/2005 |
| EP | 2027766 | 2/2009 |
| EP | 2546526 | 1/2013 |
| EP | 2581022 | 4/2013 |
| JP | 4899033 | 10/2008 |
| WO | 9730620 | 8/1997 |
| WO | 2012111318 | 8/2012 |

\* cited by examiner

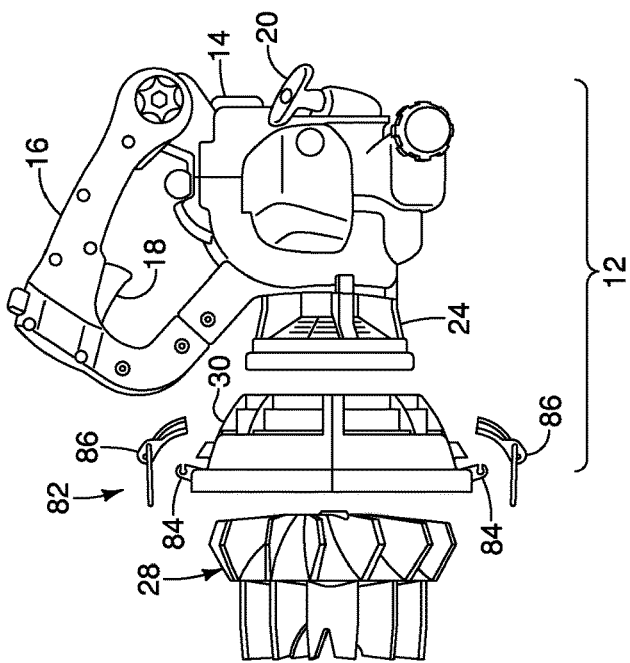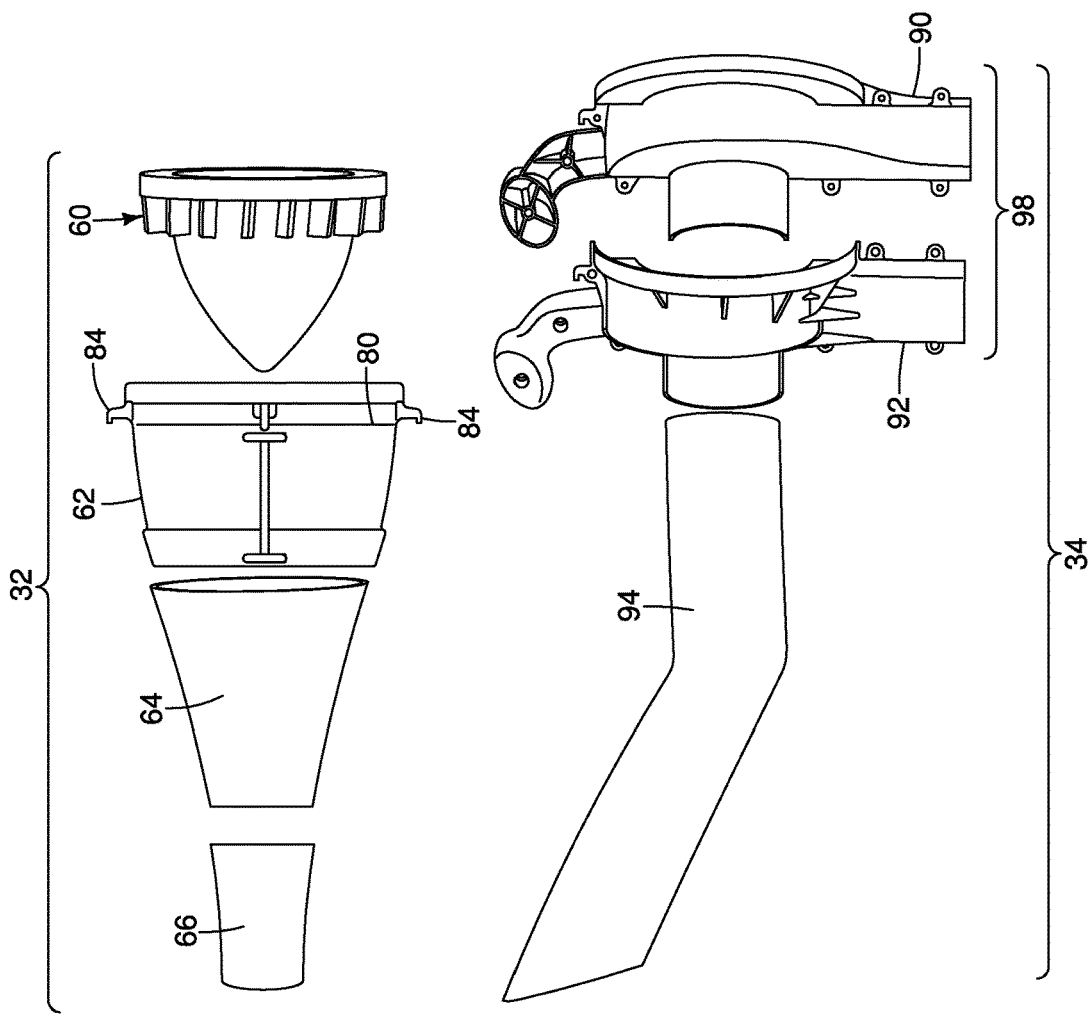
FIG. 3

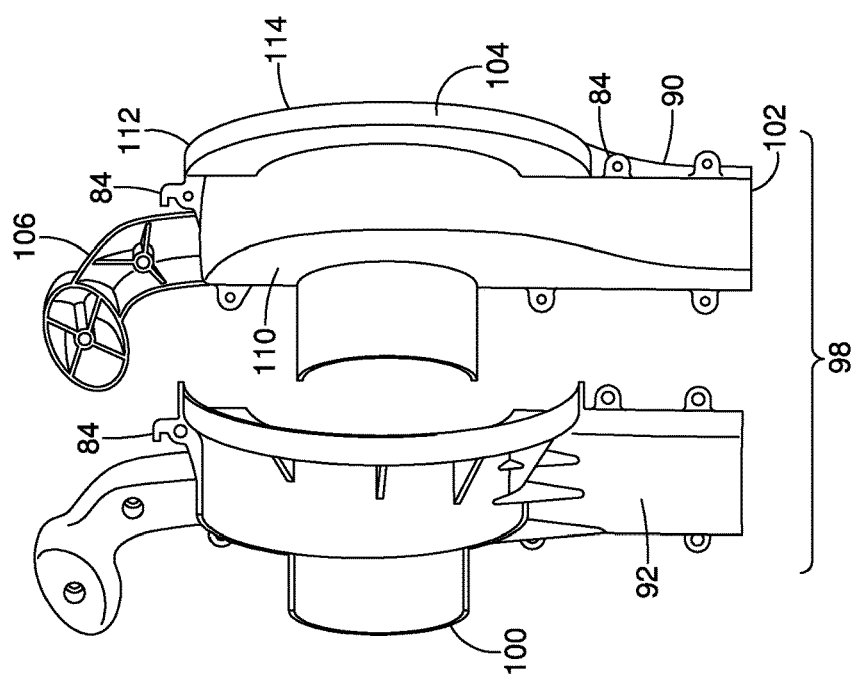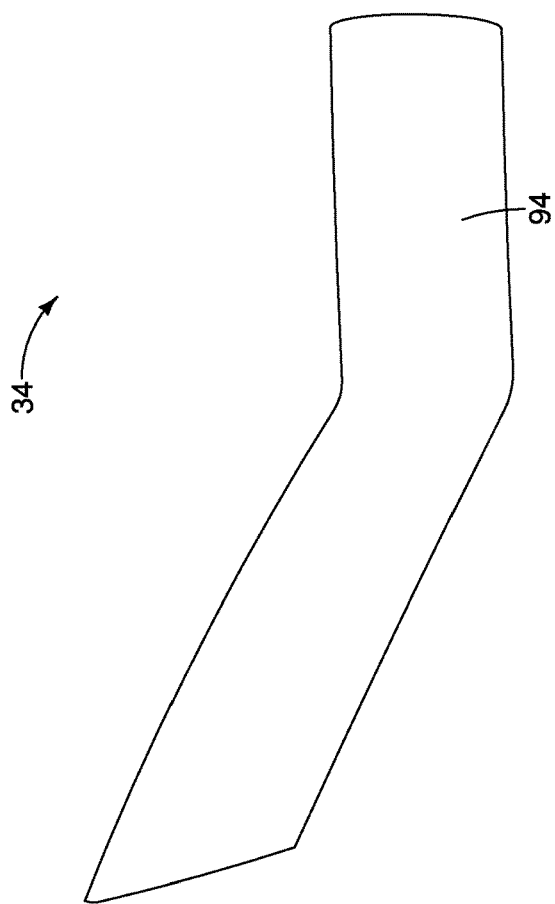
FIG. 8

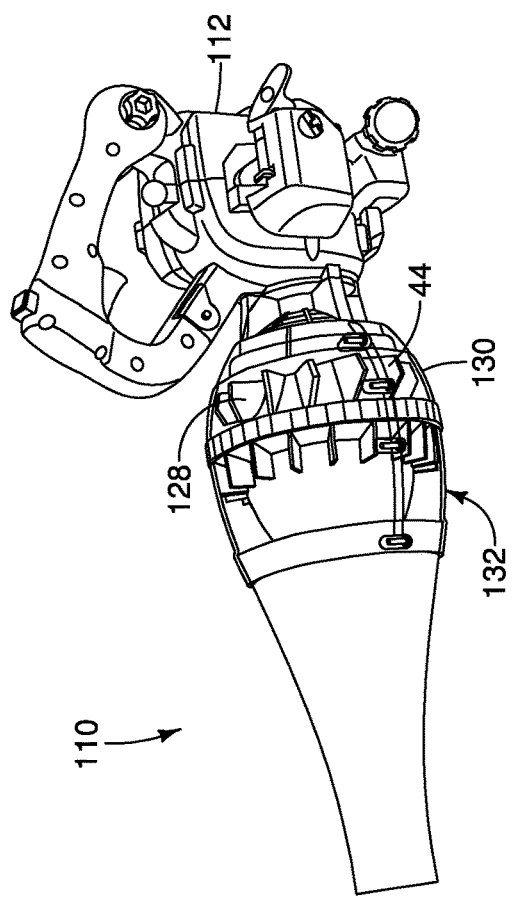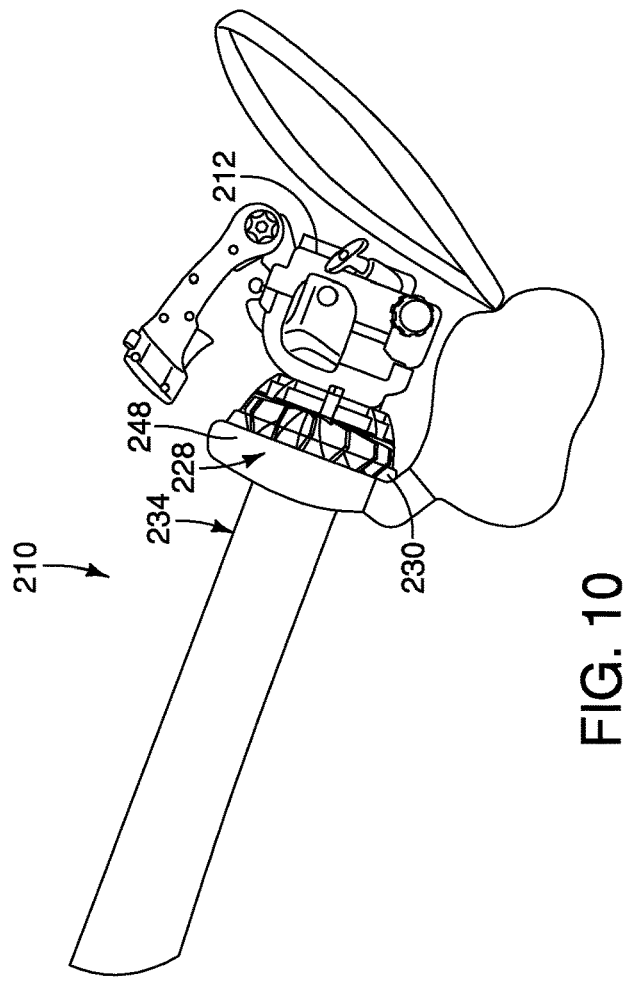

BLOWER/VACUUM

CROSS REFERENCE TO RELATED APPLICATION

The present application is a continuation application and claims priority to U.S. patent application Ser. No. 14/962,687 filed Dec. 8, 2015, which claims the priority benefit of U.S. Provisional Patent Application Ser. No. 62/089,572 filed Dec. 9, 2014, both of which are incorporated herein by reference in their entireties.

FIELD OF THE INVENTION

The present invention is directed to a handheld yard maintenance tool, and more particularly, to a portable combined blower and vacuum.

BACKGROUND OF THE INVENTION

Combined blower/vacuums are commonly used in lawn care and maintenance. These combined blower/vacuums allow an operator to switch operations between a blower for blowing leaves, cut grass, or other debris and a vacuum which can suck up the leaves, cut grass, or other debris. Typical blower/vacuums usually require a single component attachable to a base having a power source located therewithin. One method allows an operator to switch between blowing and vacuuming functions by detaching the component(s) associated with one operation and affixing the components associated with the other. The design of the components makes the method for switching between functions very cumbersome and difficult for the operator. Another method incorporates both the blower nozzle and vacuum tube combined in a single tool. This combined component is often cumbersome and weighty which causes an operator to tire more easily. The combined component also requires the operator to carry the additional inactive component during operation of the other.

BRIEF SUMMARY OF THE INVENTION

In one aspect of the present invention, a blower is provided. The blower includes a base having a housing, a handle extending from the housing, and a power source positioned within the housing. The blower further includes a drive shaft extending forwardly from the power source, wherein the drive shaft is rotatable by the power source. A fan member is operatively connected to the drive shaft. A flywheel extends rearwardly from the power source, and the flywheel is positioned adjacent to a rear of the housing. At least one rear vent formed into the rear of the housing adjacent to the flywheel. Rotation of said flywheel draws ambient air into said housing through said at least one rear vent, and rotation of the flywheel generates a cooling air flow that directs the ambient air across the power source to cool the power source during operation thereof.

In another aspect of the present invention, a blower is provided. The blower includes a base having a housing, a handle extending from the housing, and a power source positioned within the housing. The blower further includes a drive shaft extending forwardly from the power source, wherein the power source selectively rotates the drive shaft. A fan member operatively is connected to the drive shaft. A starter assembly is positioned adjacent to a rear of the housing. A flywheel extends rearwardly from the power source, and the flywheel is positioned between the power source and the starter assembly. At least one rear vent is formed into the rear of the housing. Rotation of the flywheel draws ambient air into the housing through the at least one rear vent, and rotation of the flywheel generates a cooling air flow that directs the ambient air across the power source to cool the power source during operation thereof.

In a further aspect of the present invention, a blower is provided. The blower includes a base having a handle, a housing, and power source positioned within the housing, the power source having a drive shaft extending forwardly therefrom, wherein the power source selectively rotates the drive shaft. A starter assembly is positioned adjacent to a rear of the housing. A flywheel is positioned between the starter assembly and the power source. A fan member has a first fan formed on one side thereof and a second fan formed on an opposing side thereof, and the fan member is rotatably driven by the drive shaft. A rear vent is formed into a rear of the housing, wherein rotation of the flywheel draws ambient air into the housing through the rear vent. A plurality of side vents are formed into the housing and positioned between the power source and the fan member. Rotation of the fan member draws ambient air into the housing through the plurality of side vents, and rotation of the flywheel draws ambient air into the housing through the at least one rear vent. Rotation of the flywheel generates a cooling air flow that directs the ambient air across the power source to cool the power source during operation thereof. The cooling air flow from the flywheel mixes with the ambient air entering through the side vents to increase a velocity of air flow generated by the fan member.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which:

FIG. 3 is an exploded view of a blower/vacuum with both a blower assembly and a vacuum assembly;

FIG. 8 is an embodiment of a vacuum assembly;

FIG. 9 is an embodiment of a dedicated blower;

FIG. 10 is an embodiment of a dedicated vacuum;

Figure 1:
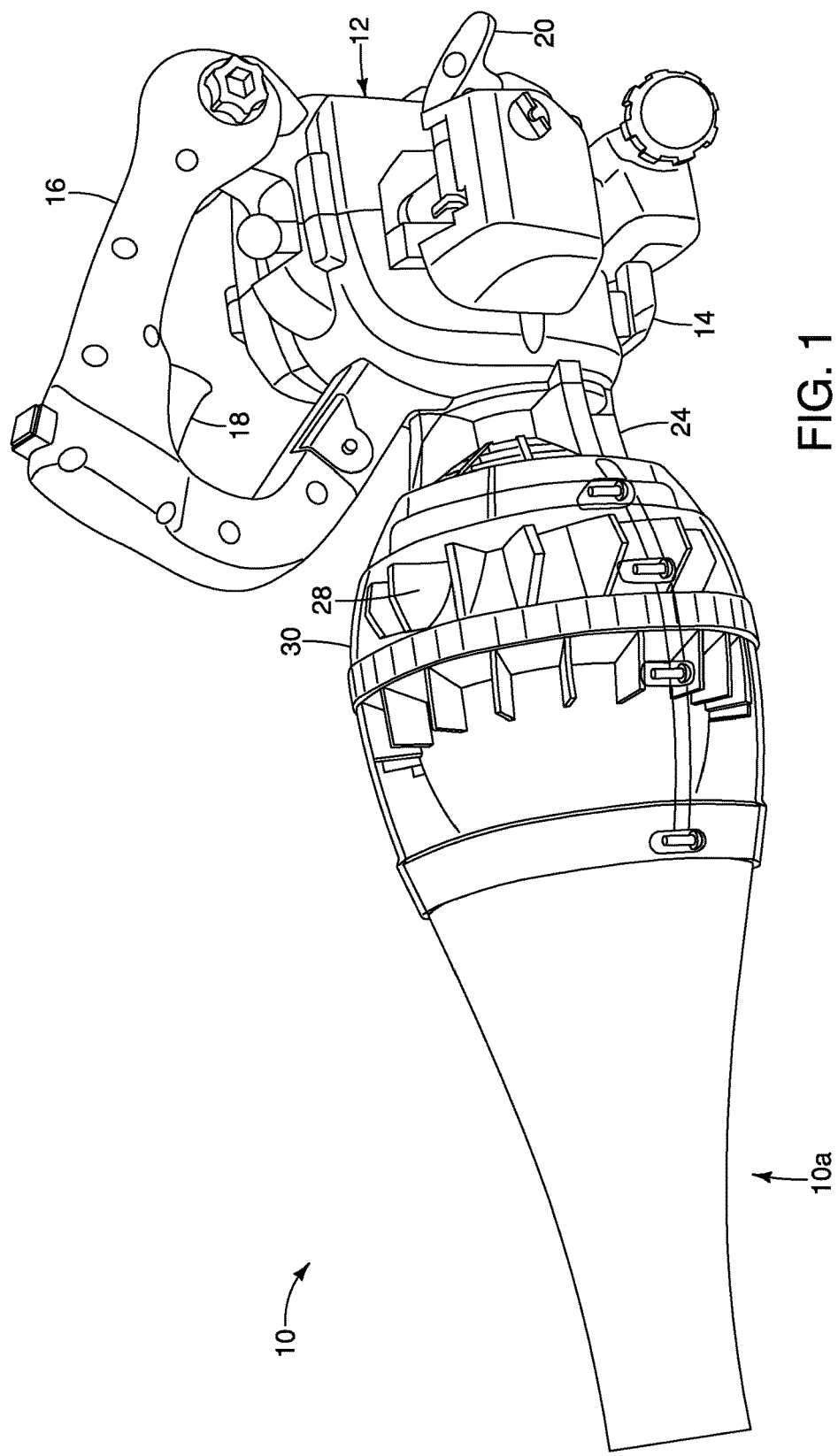
FIG. 1 is a perspective view of an embodiment of a blower/vacuum in a blower configuration.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Figure 2:
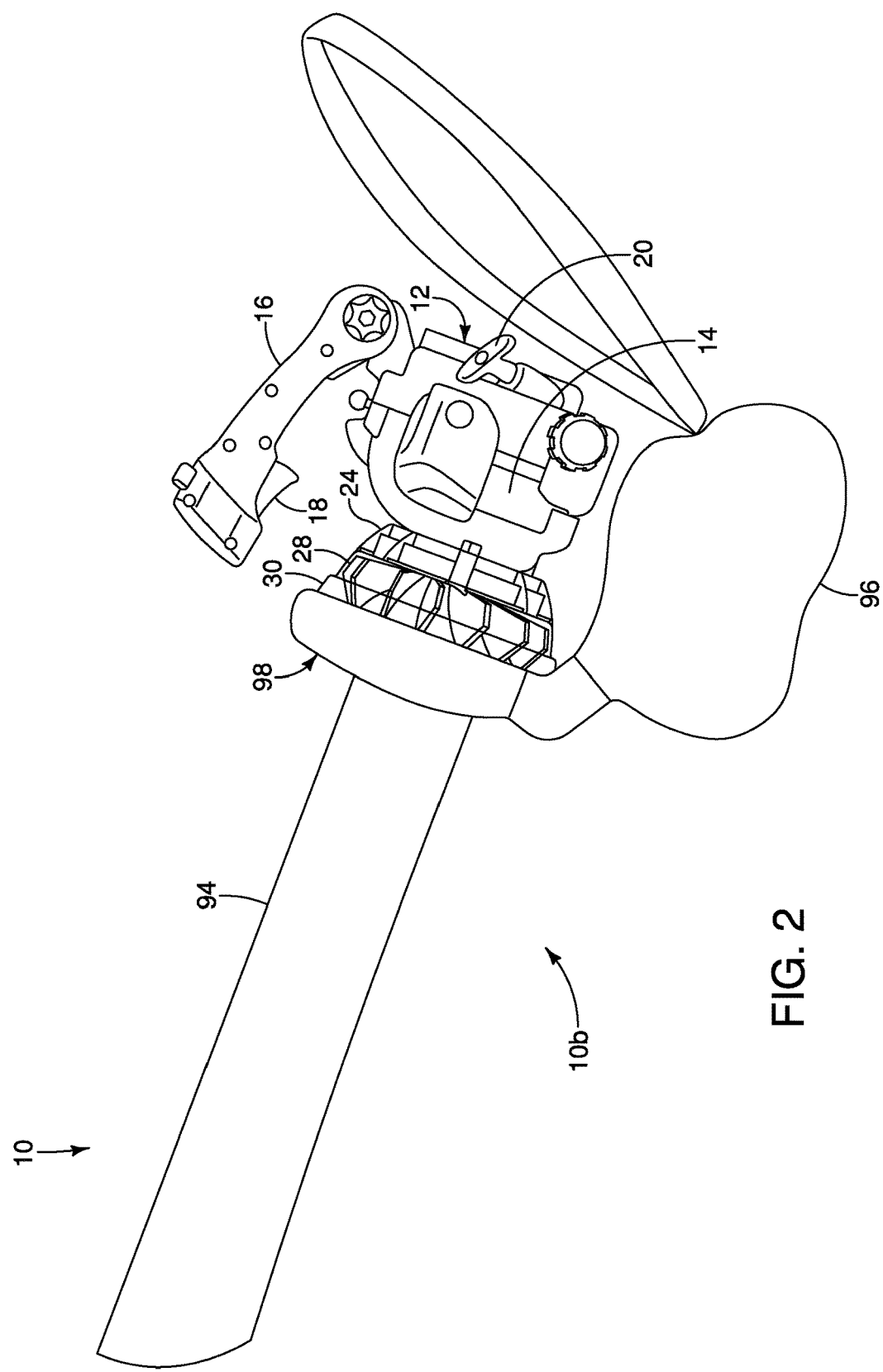
FIG. 2 is a perspective view of another embodiment of a blower/vacuum in a vacuum configuration.

Referring to FIGS. 1-3, an exemplary embodiment of a combination of a blower and a vacuum, or a blower/vacuum 10, for use in lawn care and maintenance. The blower/vacuum 10 is configured to be used as both a blower 10a (FIG. 1) in a blower operation and configuration to blow leaves or other debris when in one configuration and a vacuum 10b (FIG. 2) in a vacuum operation and configuration for collecting and mulching leaves, grass, and other yard debris. The blower/vacuum 10 is switchable by an operator between the blower configuration 10a and the vacuum configuration 10b. The blower 10a and vacuum 10b utilize the same base 12, and the removably attachable end that is connected to the base 12 determines the configuration and operation of the blower/vacuum 10.

As shown in FIGS. 1-3, an exemplary embodiment of the base 12 includes a housing 14, a graspable handle 16, a user-controlled trigger 18, a starter assembly 20, a power source 22 positioned within the housing 14, a shield 24, and an attachment shell 30. Although the embodiment shown in FIGS. 1-3 illustrates the power source 22 as an internal combustion engine having starter assembly 20, it should be understood by one having ordinary skill in the art that the power source may also be an engine having a push-button start, an electric motor powered by a rechargeable battery, a replaceable battery, an A/C-powered electric motor, or any other power source capable of providing sufficient power to operate the handheld tool. In an embodiment, the housing 14 and handle 16 are integrally formed or molded as a single piece. In another embodiment, the housing 14 and handle 16 are formed separately and attached to each other by way of a mechanical fastener or the like. In an embodiment, the handle 16 is configured to be fixedly positioned relative to the housing 14. In another embodiment, the handle 16 is movable relative to the housing 14 to allow the operator to ergonomically position the handle 16 relative to the housing 14 to maximize comfort while carrying the blower/vacuum 10. The user-controlled trigger 18 is operatively connected to the handle 16 and controls the speed of the blower/vacuum 10.

The starter assembly 20 is operatively connected to the side of the housing 16, as shown in FIG. 1. It should be understood by one having ordinary skill in the art that the starter assembly 20 can extend from either side of the housing or the rear of the housing, depending upon the orientation and type of the power source 22. In the illustrated exemplary embodiment, the starter assembly 20 is a pull-start having a handle attached to a wound rope (not shown). It should be understood by one having ordinary skill in the art that the starter assembly 20 can be formed as a different mechanical operable system for starting the power source (such as a crank, or the like) or an electrical system capable of starting the power source (such as a push-button starter, or the like).

The housing 14 is configured to protect the power source 22 (FIG. 5), or other power source, located therewithin. The housing 14 can be formed of a plurality of pieces, which allows the power source 22 to be operatively connected to the housing 14 and be disposed therein when the housing 14 is assembled.

In an embodiment, the shield 24 extends forwardly from the housing 14, wherein the shield 24 is configured to protect the drive shaft 26 (FIG. 5) that extends from the power source 22 to the fan member 28, as shown in FIGS. 1-3. The shield 24 can be formed separately from the housing 14 and attached thereto, or the shield 24 can be integrally formed with a portion of the housing 14. In an embodiment, the shield 24 is a single member. In another embodiment, the shield 24 is formed of multiple pieces. At least a portion of the shield 24 is positioned within the attachment shell 30.

In an embodiment, the attachment shell 30 of the base 12 is formed as a generally conical shape that extends from the housing 14 and surrounds at least a portion of the shield 24, as shown in FIGS. 1-3. The attachment shell 30 is configured to provide a structure to which the blower assembly 32 and the vacuum assembly 34 are removably and selectively attachable. In an embodiment, the attachment shell 30 is formed of a clear, or otherwise transparent material. For example, the attachment shell 30 is formed of clear polycarbonate, plastic, or any other materials providing sufficient strength and rigidity to withstand the pressure increases and decreases within the attachment shell 30 as well as withstand repeated contact with debris that is suctioned when in the vacuum configuration 10b while also being transparent to allow an operator the ability to view into the attachment shell 30 to determine if there is a blockage or any other problem. It should be understood by one having ordinary skill in the art that the attachment shell 30 may also be formed of a non-clear or a non-transparent material. The attachment shell 30 surrounds at least a portion of the fan member 28.

In the exemplary embodiment shown in FIGS. 1-3 and 5-6, the mixed-flow fan member 28 is operatively connected to the base 12 and is powered by the power source 22 by way of a drive shaft 26. The drive shaft 26 is configured to rotate in the same direction during both the blower configuration as well as the vacuum configuration, and the fan member 28 is configured to provide positive-pressure air flow when the blower assembly 32 is attached to the attachment shell 30 and a reduced-pressure air flow when the vacuum assembly 34 is attached to the attachment shell 30.

Figure 6:
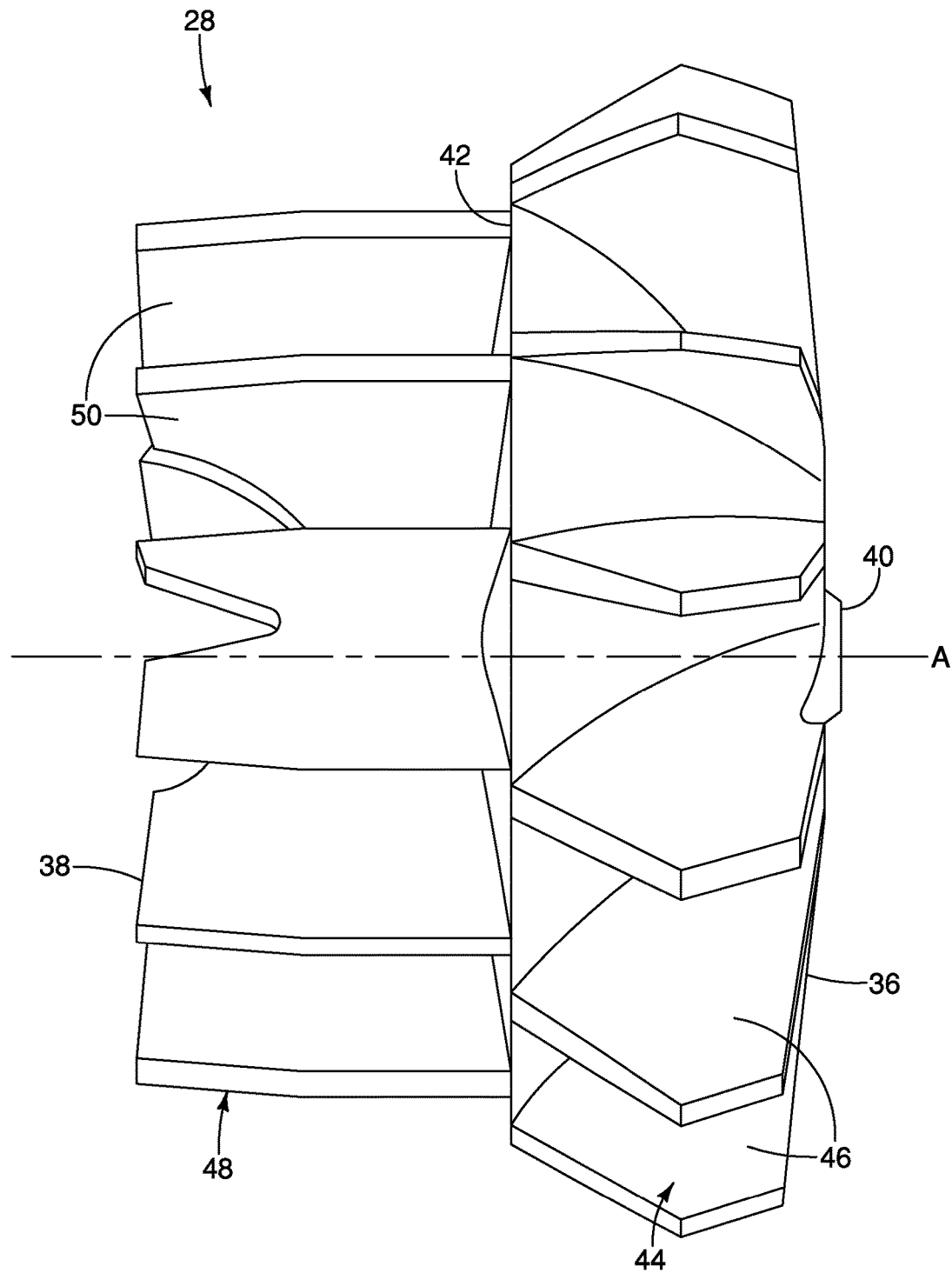
FIG. 6 is an embodiment of a fan member.

In the illustrated exemplary embodiment, the mixed-flow fan member 28 is formed as a one-piece member, as shown in FIG. 6, of molded plastic but can be formed of any material. In an embodiment, the fan member 28 includes a rear end 36, a forward end 38, central hub 40, a plate 42 extending radially from the central hub 40, a first fan 44 having a plurality of first fan blades 46 extending radially from the central hub 40, and a second fan 48 having a plurality of second fan blades 50 extending radially from the central hub 40. In another embodiment, the fan member 28 is includes a first fan 44 formed separately from the second fan 48, wherein the first and second fans 44, 48 are attached to each other to form the fan member 28. In some embodiments, the fan member 28 does not include the plate 42 separating the first and second fans 44, 48. When assembled, the rear end 36 of the fan member 28 is directed toward the power source 22 and the longitudinal direction of the fan member 28 is aligned with the drive shaft 26. The hub 40 is a cylindrical member aligned axially with the drive shaft 26, wherein the drive shaft 26 is received within the hub 40 to allow the fan member 28 to be releasably attached or otherwise connected to the drive shaft 26. The drive shaft 26 is configured to drive, or rotate, the fan member 28 about the axis formed by the draft shaft 26. The fan member 28 is formed as a single component in which each of the portions of the fan member 28 are integrally formed together. In an embodiment, the fan member 28 is formed of molded plastic or other resilient material that may include aluminum, titanium, high density polyethylene (HDPE), or any other resilient material.

Fans used for generating air flow are typically formed as an axial fan or a centrifugal fan. Axial fans are configured to have a plurality of fan blades extending substantially radially from a hub, wherein the radial fan blades generate air flow that is aligned, or parallel to the drive shaft to which the fan is attached. In other words, the axial fan pushes the air along from upstream to downstream along a linear-like pathway. The fan blades of the axial fan are typically arranged in a cantilever arrangement such that the base of the blade is attached to a hub and the tips of the blade are unconstrained. Axial fans are often used in wind turbines, box/home fans, fume extraction, winnowing, and the like. Centrifugal fans are configured to have a plurality of fan blades attached to the outer circumferential surface of a central hub, wherein the fan blades extend radially outward from the hub. Upstream air is drawn toward the central hub of the centrifugal fan, wherein the fan blades are aligned and oriented to push the air radially outward in a centrifugal manner. The blades of the centrifugal fan are typically positioned against a plate (or between a pair of parallel plates) that likewise extends from the central hub, wherein the plate prevents axial movement of the air flow, thereby generally confining the air flow to radial flow. Centrifugal fans are often used in handheld lawn care blowers, HVAC systems, and the like where the desired air flow is radially outward from the fan. The fan member 28 used in the blower/vacuum incorporates aspects of both axial and centrifugal fans to provide a mixed-flow fan, wherein the generated air flow is both radial and axial.

As shown in the exemplary embodiment of the fan member 28 in FIG. 6, the plate 42 is formed as a substantially circular and planar member that extends radially from the outer circumference of the central hub 40, wherein the plate 42 is positioned about midway between the rear end 36 and the forward end 38 of the fan member 28. The plate 42 is configured to separate the first fan 44 from the second fan 48, thereby providing two distinct operations of the fan member 28—one for blowing and the other for vacuuming, as will be explained below. In an embodiment, the first and second fan blades 46, 50 have substantially the same width relative to the longitudinal axis of the fan member 28 between the rear and forward ends 36, 38 thereof. In other embodiments, the plate 42 is positioned longitudinally closer to either the rear end 36 or the forward end 38 of the fan member 28, thereby allowing either the first or second fan blades 46, 50 to have a larger width than the other set of fan blades.

Figure 5:
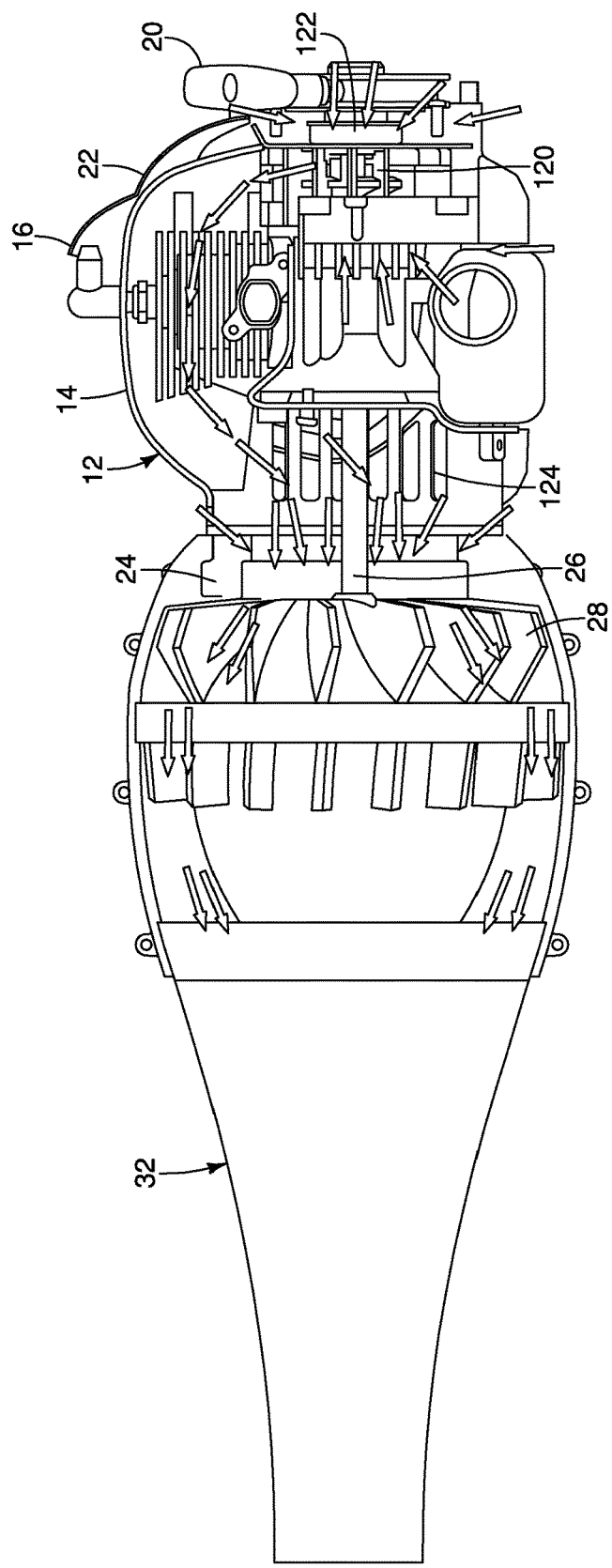
FIG. 5 is a partial cross-sectional view of the base of a blower/vacuum.

In the exemplary embodiment of the fan member 28 shown in FIG. 6, the first fan 44 is configured as an axial fan in which the first fan blades 46 are operatively connected to the central hub 40, extending radially outward beyond the circumferential outer edge of the plate 42 in a cantilevered manner. In the illustrated exemplary embodiment, the first fan blades 46 are angled or curved relative to the central hub 40. The first fan blades 46 are both angled along the circumference of the hub 40 but also curved between the base (intersecting with the hub 40) and the tip (radially outward edge) of each blade. In this embodiment, the base of each of the first fan blades 46 is angled such that the base is radially closer to the drive shaft 26 near the rear end 36 and radially further away from the drive shaft 26 near the plate 42. The outer circumferential edge of the first fan blades 46 is also formed at an angle between the plate 42 and the rear end 36. In a further embodiment, the base of each of the first fan blades 46 is aligned with the longitudinal axis A, and the first fan blades 46 extend in a substantially planar manner between the base and tip of each blade. It should be understood by one having ordinary skill in the art that the first fan blades 46 can be planar, curved, a combination thereof, or have any shape sufficient to provide increased air flow resulting from the rotation of the fan member 28, wherein the air flow generated by the first fan blades is substantially parallel to the drive shaft 26 (FIG. 5). In an embodiment, the first fan blades 46 extend from a frustoconical surface operatively connected to the central hub 40, wherein the radial distance between the frustoconical surface and the central hub 40 increases as it extends away from the rear end 36 toward the plate 42.

In the exemplary embodiment of the fan member 28 illustrated in FIG. 6, the second fan 48 is formed as a centrifugal fan. The second fan 48 is formed of a plurality of second fan blades 50 that are positioned between the plate 42 and the forward end 38. The second fan blades 50 extend from the central hub 40 in a substantially planar manner, wherein the blade tip of each of the second fan blades 50 is aligned with the longitudinal axis A and substantially aligned with the outer circumference of the plate 42, but it should be understood by one having ordinary skill in the art that tips of the second fan blades 50 may extend beyond the outer circumferential edge of the plate 42. In another embodiment, the second fan blades 50 are curved, similar to the curved first fan blades 46 described above. In the illustrated embodiment, the first fan blades 46 extend radially outward a greater distance than the second fan blades 50.

The first fan 44 and the second fan 48 of the fan member 28 are configured to perform separate operations, depending upon the configuration of the blower/vacuum 10 and the mode of the fan member 28. For example, when the blower assembly 32 is attached to the base 12, the blower/vacuum 10 is in the blower configuration 10a (FIG. 1). In the blower configuration 10a, the fan member 28 is in the blower mode in which the first fan 44 is active and the second fan 46 is inactive but continues to rotate in conjunction with the first fan 44. Accordingly, in the blower mode and configuration 10a, the first fan 44 is configured to provide positive-pressure air flow to cause air to be blown axially through the blower assembly 32.

When the vacuum assembly 34 is attached to the base 12, the blower/vacuum 10 is in the vacuum configuration 10b (FIG. 2). In the vacuum configuration 10b, the fan member 28 is in the vacuum mode in which the second fan 46 is active and the first fan 44 is inactive but continues to rotate in conjunction with the second fan 46. Accordingly, in the vacuum mode and configuration 10b, the second fan 48 is configured to provide negative-pressure air flow to cause air to be drawn toward the base 12 into and through the vacuum assembly 34 due to the centrifugal air flow from the second fan 46. In both the blower and vacuum modes and configurations 10a, 10b, the fan member 28 is configured to blow air through an outlet port. In the blower configuration 10a, the air flow from the fan member 28 exits through the blower tube 62 which acts as the outlet port, as explained below; in the vacuum configuration 10b, the air flow from the fan member 28 exits through the outlet 102 of the fan housing 104 which acts as the outlet port, as explained below. The switchability between the blower and vacuum configurations 10a, 10b, as illustrated in FIG. 4, causes each of the first and second fans 44, 48 to be utilized separately for different configurations of the blower/vacuum 10.

Figure 7:
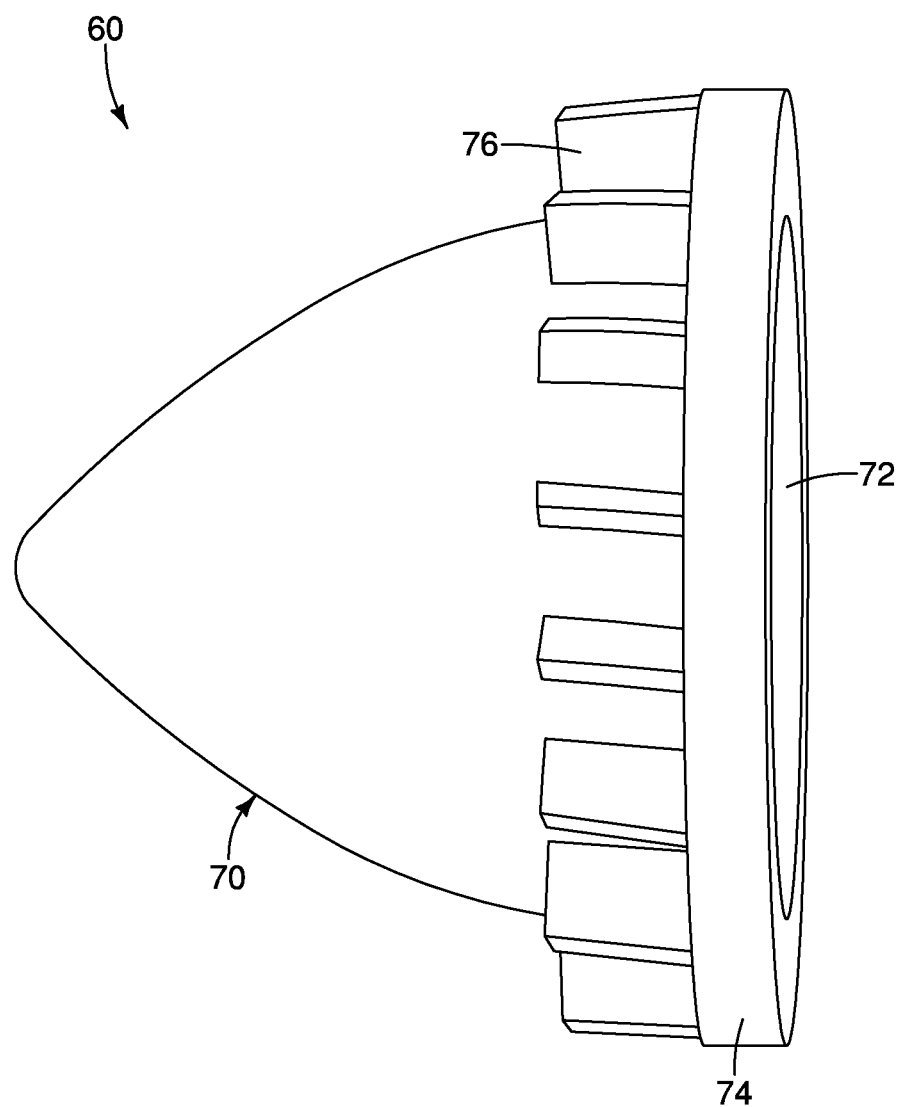
FIG. 7 is an embodiment of a diffuser.

As shown in FIG. 3, an embodiment of the blower assembly 32 includes a diffuser 60, a blower housing 62, a blower tube 64, and an optional extension tube 66. The blower assembly 32 is releasably attachable to the base 12 to generate the blower configuration 10a (FIG. 1). In an embodiment, the diffuser 60 includes an elongated cone 70 having an open end 72, a platform 74 surrounding and extending radially outward from the open end 72, and a plurality of vanes 76 extending from the platform 74 adjacent to the outer circumferential surface of the cone 70, as illustrated in FIG. 7. The cone 70 is an elongated, substantially hollow member, wherein the open end 72 is positioned upstream, or otherwise directed toward the base 12. The tip of the cone 70 extends away from the open end 72 and the base 12, wherein the diameter of the cone 70 narrows as the cone 70 extends away from the open end 72. The open end 72 forms a substantially circular opening to the inside of the cone 70. The open end 72 is configured to receive and completely surround the second fan 48 of the fan member 28.

The platform 74 is formed of an annular ring and a plurality of ribs, wherein the annular ring is operatively connected to the outer surface of the cone 70 by way of the plurality of ribs. The ribs form open pathways between the annular ring and the cone 70 to allow air to flow from the fan member 28 and past the diffuser 60 between the annular ring of the platform 74 and the cone 70, as shown in FIG. 7. The air flow through the platform 74 between the annular ring and the cone 70 is generated by the first fan 44 of the fan member 28. In an embodiment, the vanes 76 are extensions of the ribs of the platform 74 such that the vanes 76 and the ribs are aligned to provide a continuous wall or barrier for directing the air flow over the outer surface of the cone 70. In another embodiment, the vanes 76 are spaced apart from the ribs of the platform 74 in order to form separate barriers for directing the air flow over the outer surface of the cone 70 separate from the ribs that provide pathways through which air can pass through the platform 74. The vanes 76 can be formed as planar members or curved members for directing the flow of air past the outer surface of the cone 70, but it should be understood by one having ordinary skill in the art that the overall shape, configuration, and placement of the vanes 76 is optimized to maximize performance of the blower/vacuum 10 when in the blower configuration 10a.

Figure 4:
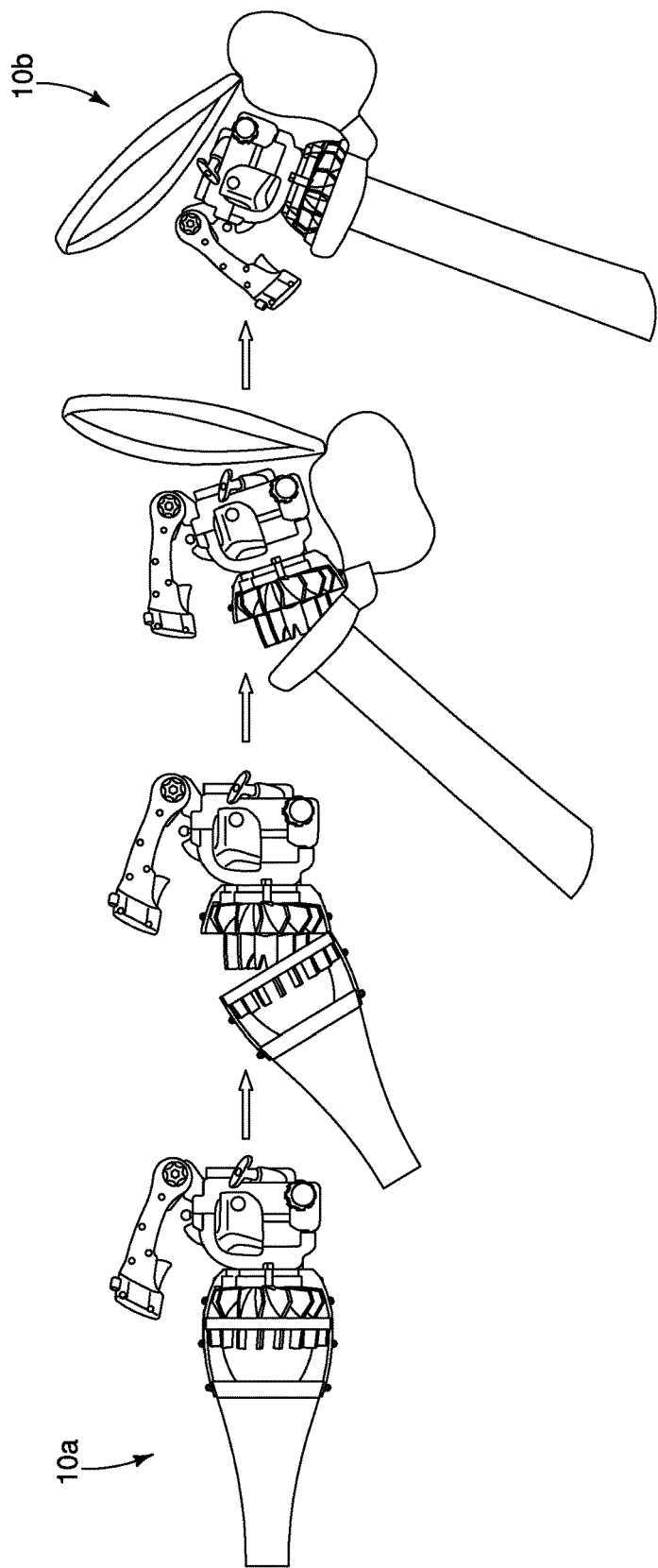
FIG. 4 is a schematic illustrating the steps for switching between a blower configuration and a vacuum configuration.

In an embodiment, the blower housing 62 of the blower assembly 32 is attachable to the attachment shell 30 of the base 12 to operatively connect the blower assembly 32 to the base 12, as shown in FIGS. 3-5. The blower housing 62 is a clear, or otherwise substantially transparent, member configured to receive and surround the diffuser 60. The blower housing 62 provides a flow path with a narrowing diameter to aide in increasing the velocity of the air as it flows over the diffuser 60. The blower housing 62 includes a ridge 80 formed on the inner surface thereof, wherein the diffuser 60 is configured to abut the ridge 80 when the blower housing 62 is attached to the attachment shell 30. The ridge 80 provides positive positioning of the diffuser 60 relative to the fan member 28 when the blower assembly 32 is attached to the base 12.

The blower housing 62 is attachable to the attachment shell 30 by way of at least one attachment mechanism 82. FIG. 3 illustrates an exemplary embodiment of a mechanical attachment mechanism 82, which includes an anchor 84 integrally formed with both the blower housing 62 and the attachment shell 30. The anchor 84 is formed generally as a hook that extends away from the opposing member to which it is being attached. The attachment mechanism 82 also includes a toggle 86, which is secured to one of the anchors 84 and is configured to releasably engage the anchor 84 on the opposing member. For example, in an embodiment, the toggle 86 is secured to the anchor 84 of the blower housing 62 by way of a pin that provides an axis of rotation for the toggle 86, and the toggle 86 is configured to releasably engage the anchor 84 on the attachment shell 30. In another embodiment, the toggle 86 is secured to the anchor 84 of the attachment shell 30 with the pin and is configured to releasably engage the anchor 84 of the blower housing 62.

Because only one anchor-toggle-anchor attachment mechanism 82 would be insufficient to completely secure the blower housing 62 to the attachment shell 32, one embodiment of the attachment shell 32 and blower housing 62 may include two, three, or more anchor-toggle-anchor attachment mechanisms 82 positioned about the periphery to attach these members together. In another embodiment, an anchor-toggle-anchor attachment mechanism 82 may be used in conjunction with a hook-and-loop attachment mechanism 82, wherein the hook-and-loop (not shown) includes a loop extending from the attachment shell 32 and a hook extending from the blower housing 62 such that the hook is received in the loop to form a hinge or rotatable connection between the blower housing 62 and the attachment shell 32 which allows the blower housing 62 to be positively secured and rotatable with the hook-and-loop attachment mechanism while the anchor-toggle-anchor attachment mechanism is secured at the opposite edge between the members.

In a further embodiment, another attachment mechanism 82 for securing the blower housing 62 to the attachment shell 30 is a threaded engagement (not shown) in which both the blower housing 62 and the attachment shell 30 include threads which are configured to mesh with the threads of the opposing member which allow the blower housing 62 to be twisted relative to the attachment shell 30 such that the threads mesh and provide a positive releasable engagement therebetween. In yet another embodiment, the attachment mechanism(s) 82 between the blower housing 62 and the attachment shell 30 include a plurality of bolts (not shown) that allow the blower housing 62 to be releasably attachable to the attachment shell 30. While these exemplary embodiments of attachment mechanisms 82 are mechanical, the attachment mechanisms 82 can also be formed as magnets that provide releasable engagement between the blower housing 62 and the attachment shell 30. It should be understood by one having ordinary skill in the art that any attachment mechanism 82, or a plurality of the same or different attachment mechanisms, can be used to provide for releasable attachment between the blower housing 62 and the attachment shell 30.

In an embodiment, the blower tube 64 of the blower assembly 32 is releasably attachable to the end of the blower housing 62 opposite the end attachable to the attachment shell 30, as shown in FIGS. 1, 3, and 4-5. The blower tube 64 is an elongated tube having an inlet and an outlet, wherein the diameter of the inlet is larger than the diameter of the outlet. This reduced diameter acts to increase the velocity of the air flow through the blower tube 64. In an embodiment, the blower tube 64 is releasably securable to the blower housing 62 by way of at least one attachment mechanism (not shown), such as a keyed locking mechanism or the like. In another embodiment, the blower tube 64 is releasably securable to the blower housing 62 by way of a friction fit.

In the embodiment illustrated in FIG. 3, the blower assembly 32 includes an extension tube 66 that is attachable to the blower tube 64. The extension tube 66 is configured to extend the length of the blower tube 64 to allow the operator to remain standing upright yet position the end of the blower assembly 32 as close to the ground or surface being blown without the need to bend over to achieve such positioning. The length of the extension tube 66 can vary depending upon the height of the operator or the operation in which the blower configuration 10*a* is being used.

When the blower/vacuum 10 is in the blower configuration 10*a,* the blower assembly 32 is attached to the base 12 by way of at least one attachment mechanism 82, as shown in FIGS. 1, 3, and 5. As the blower housing 62 is secured to the attachment shell 30, the diffuser 60 is abutting the ridge 80 formed on the inner surface of the blower housing 62, and the diffuser 60 is positively positioned relative to the fan member 28 such that the second fan 48 is inserted through the open end 72 and located within the cone 70 of the diffuser 60. In this position, the platform 74 is either abutting the plate 42 of the fan member 28 that separates the first and second fans 44, 48 or is positioned immediately adjacent to the plate 42. In an embodiment, the diffuser 60 contacts the plate 42 of the fan member 28. In another embodiment, the diffuser 60 is spaced very slightly apart from the plate of the fan member 28. The positioning of the diffuser relative to the fan member 28, wherein the second fan 48 is located within the cone 70 of the diffuser 70, leaves only the first fan blades 46 exposed to generate a positive-pressure air flow directed over the diffuser 60 while simultaneously deactivating the effect of the second fan 48 as any air movement generated by the second fan 48 is contained within the cone 70 of the diffuser 60. The diffuser 60 effectively "hides" the second fan blades 50 to allow only the first fan blades 46 to be active in the blower configuration 10*a,* but the second fan 48 continues to rotate simultaneously with the first fan 44.

In operation, the throttle 18 of the base 12 controls the output rotational speed from the power source 22 that rotates the drive shaft 26 which, in turn, rotates the fan member 28. As the first fan blades 46 of the fan member 28 are exposed in the blower configuration 10*a,* rotation of the first fan 44 generates a positive-pressure air flow directed over the diffuser 69, through the blower housing 62, blower tube 64, and then through the optional extension tube 66, if present. As the rotational output of the power source 22 is increased in response to the throttle 18, the velocity of the air flow through the blower assembly 32 increases, and vice-versa with respect to the velocity of the air flow.

In the illustration of FIG. 4, the blower assembly 32 is removable from the base 12 and replaceable with the vacuum assembly 34, and vice-versa, to switch the blower/vacuum 10 from the blower configuration 10*a* (FIG. 1) to the vacuum configuration (FIG. 2). Similar to the blower assembly 32 is releasably attachable to the attachment shell 30 of the base 12 using at least one attachment mechanism 82 for positively securing the vacuum assembly 34. In an exemplary embodiment of a vacuum assembly 34 illustrated in FIGS. 2-3 and 8, the vacuum assembly 34 includes a first vacuum shell 90 and a second vacuum shell 92 which together form a vacuum housing 98, a vacuum tube 94, and an optional collection bag 96.

The first and second vacuum shells 90, 92 of the vacuum assembly 34 are formed as substantially mirror images of each other and are attachable together to form a vacuum housing 98, as shown in FIGS. 2-3 and 8. The vacuum housing 98 includes an inlet 100, an outlet 102, a fan housing 104, and an optional handle 106. In an embodiment, the first and second vacuum shells 90, 92 include a plurality of bosses to allow the opposing shells to be connected together with nuts and bolt. In another embodiment, the first and second vacuum shells 90, 92 can be connected together using any attachment mechanism that allows the shells to be releasably attachable. In the illustrated embodiment, the vacuum housing 98 is formed of separate pieces. In another embodiment, the vacuum housing 98 is formed as a single integral member.

The fan housing 104 of the vacuum housing 98 is fluidly connected to both the inlet 100 and the outlet 102, thereby providing a continuous pathway between the inlet 100 and outlet 102 and through the fan housing 104, as shown in FIGS. 2-3 and 8. The fan housing 104 has a toroid-like shape without the inner diameter surface, thus providing a vertically-aligned forward wall 110, a rear wall 112 oriented parallel relative to the forward wall 110, and an annular wall 114 extending between the forward wall 110 and the rear wall 112. The forward wall 110 includes an opening from which the inlet 100 extends in a forward direction. The rear wall 112 likewise includes a circular opening. The outlet 102 extends in a downward direction from the annular wall 114, in a substantially perpendicular manner relative to the inlet 100, from the fan housing 104. The toroidal fan housing 104 is configured to receive a portion of the fan member 28 through the opening in the rear wall 112 when the vacuum housing 98 is operatively connected to the base 12.

The vacuum housing 98 is attachable to the base 12 in a similar manner as the blower housing 62, in particular, by way of at least one attachment mechanism 82, described above. The same attachment mechanism 82 should be used to attach the vacuum housing 98 to the base 12 as used to attach the blower housing 62 to the base 12. For example, the illustrated exemplary embodiment utilizes at plurality of anchor-toggle-anchor attachment mechanisms to attach the vacuum assembly 24 to the attachment shell 30 of the base 12, but it should be understood by one having ordinary skill in the art that any other attachment mechanism(s) can be used.

The vacuum tube 94 of the vacuum assembly 34 is attachable to the vacuum housing 98 to provide an extension for the suction inlet 100 to be located closer to the ground or other structure so as to reduce or eliminate the need for the operator to continually bend over in order to use the vacuum/blower 10 in the vacuum configuration 10*b*. The vacuum tube 94 is an elongated tubular member which can be formed as a straight tube (FIG. 2) or a tube having at angled portion (FIG. 3). The vacuum tube 94 is configured to be attached to the inlet 100 that extends forwardly from the fan housing 104. In an embodiment, the vacuum tube 94 is attached to the inlet 100 by friction fit in which the inner diameter of the vacuum tube 94 is the same or just slight larger diameter than the outer diameter of the inlet 100 such that the vacuum tube 94 is slid over the inlet 100 for installation. In another embodiment, the vacuum tube 94 is attached to the inlet 100 by way of at least one attachment mechanism, which can be either the same type or a different type than used to attach the vacuum housing 98 to the base 12.

The vacuum housing 98 includes an optional handle 106 (included—FIG. 8; not included—FIG. 2), wherein the handle 106 extends upwardly from the fan housing 104. The handle 106 allows the user to use both hands to grasp the blower/vacuum 10, wherein one hand can grasp the handle 16 of the base and the other hand can grasp the handle 106 of the vacuum housing 98. When the vacuum housing 98 includes a handle 106, the entire handle 106 can be integrally formed with one of the first or second vacuum shells 90, 92, or half of the handle 106 can be integrally formed with a respective vacuum shell 90, 92 such that when the first and second vacuum shells 90, 92 are attached to each other, the handle halves form a complete handle 106.

The vacuum assembly 34 further includes an optional collection bag 96, which is attachable to the outlet 102 of the vacuum housing 98, as shown in FIGS. 2 and 4. The collection bag 96 includes a port that is configured to engage the outlet 102 by a friction fit. The collection bag 96 includes a strap that can be positioned over the shoulder of the operator, which allows the weight of the debris in the collection bag 96 to be carried by the operator's body as opposed to having the entire weight added to the blower/vacuum 10 being carried.

In the illustrated embodiment, assembly of the blower/vacuum 10 in the vacuum configuration 10b includes attaching the first and second vacuum shells 90, 92 together to form the vacuum housing 98. The vacuum housing 98 is then attached to the attachment shell 30 of the base 12 using a plurality of attachment mechanisms 82 which connect opposing anchors 84 located on both the attachment shell 30 and the vacuum housing 98. As the vacuum housing 98 is positioned against the attachment shell 30, the fan assembly 28 is inserted into the opening in the rear wall 112 of the fan housing 104 such that the second fan 48 is positioned within the fan housing 104 and the rear wall 112 is abutting or positioned immediately adjacent to the plate 42 of the fan member 28. Because the rear wall 112 of the fan housing 104 either slightly contacts or is positioned immediately adjacent to the plate 42 of the fan member 28 such that the second fan 48 is located within the fan housing 104, the first fan 44 is effectively deactivated as air flow caused by rotation of the first fan blades 46 is blocked by the rear wall 112 of the fan housing 104. As such, only the second fan blades 50 of the second fan 48 are active in the vacuum configuration 10b. The vacuum tube 94 and collection bag 96 can then be attached to the vacuum housing 98.

In operation, the throttle 18 of the base 12 controls the output rotational speed from the power source 22 that rotates the drive shaft 26 which, in turn, rotates the fan member 28. As the second fan blades 50 of the fan member 28 are active within the fan housing 104 in the vacuum configuration 10b, rotation of the second fan 48 generates a negative-pressure air flow which creates a suction with draws air into the fan housing 104 through the inlet 100 (via the vacuum tube 94). The air flow and any debris that is drawn into the fan housing 104 are then ejected out through the outlet 102 via centrifugal air flow generated by the second fan 48 of the fan member 28. While the debris is within the fan housing 104, the rotation of the second fan 48 acts to crush, pulverize, or otherwise break up at least some of the debris into smaller particles. As the rotational output of the power source 22 is increased in response to the throttle 18, the velocity of the air flow through the vacuum assembly 34 increases, and vice-versa with respect to the velocity of the air flow.

The exemplary embodiment of the combined blower/vacuum 10 described above utilizes a single fan member 28 that integrates both a first fan 44 and a second fan 48, wherein each fan is configured to generate either a positive-pressure or negative-pressure air flow. The blower/vacuum 10 is adapted to receive a blower assembly 32 that covers or hides the second fan 48 in a blower configuration 10a to effectively deactivate the second fan 48 which allows the first fan 44 to generate the positive-pressure air flow through the blower assembly 32. The blower/vacuum 10 is also adapted to receive a vacuum assembly 34 that covers or otherwise hides the first fan 44 in a vacuum configuration 10b to effectively deactivate the first fan 44 which allows the second fan 48 to generate the negative-pressure air flow through the vacuum assembly 34. In the blower and vacuum configurations, the fan member 28 generates different types of air flow: axial air flow in the blower configuration and centrifugal air flow in the vacuum configuration. These two separate air flows generated by the same fan member 28 make the fan member 28 a mixed-flow fan, thereby allowing a single fan member 28 to be used in two completely distinct operations in different configurations.

The blower/vacuum 10, when in the blower configuration 10a as shown in FIG. 5, includes a power source 22 that is configured to super-charge the velocity of air flow being expelled from the blower assembly 32. The power source 22 includes a rearwardly-directed flywheel 120 that is positioned adjacent to the starter assembly 20 at the rear of the base 12. As air is drawing into the housing 14 through rear vents 122, the flywheel 120 directs the air over the engine components for cooling and then into the blower intake area. The flywheel 120 includes a combination of fan vanes as well as a pair of oppositely-opposed magnets, wherein the magnets are configured to act in combination with an ignition module that generates a spark for the combustion cylinder. The air from the flywheel 120 that is forced over the power source 22 is mixed and added to the air drawn into the blower intake area through the side vents 124 that are positioned between the power source 22 and the fan member 28. The forced air from the flywheel 120 results in increased air flow velocity produced by the first fan 44 in the blower configuration 10a, thereby generating a super-charged, or increased air flow. It should be understood that the fan member 28 produces enough suction of air from the housing 14 to cool the engine components without the flywheel 120, but the flywheel 120 provides more efficient and more powerful blowing when a flywheel 120 is used. The flywheel 120 positioned at the rear of the base 12 for generating cooling airflow over the engine also improves the performance of the engine as compared to the performance of the engine relying solely upon the fan member 28 creating air flow over the engine or the flywheel positioned at the front of the engine (between the engine and the fan member 28).

In another embodiment, the combined blower and vacuum 10 is either a dedicated blower 110 (FIG. 9) or a dedicated vacuum 210 (FIG. 10), wherein the dedicated blower 110 and dedicated vacuum 210 are not interchangeable between operations or configurations. The dedicated blower 110 includes substantially the same components as the blower/vacuum 10, such as a base 112, a drive shaft (not shown), an attachment shell 130, a fan member 128, and blower assembly 132. The fan member 128 of the dedicated blower 110 includes only the first fan 144 but not the second fan 48 (FIG. 6), because the second fan 48 would never be utilized in the dedicated blower 110. In the illustrated embodiment, the first fan 144 of the dedicated blower 110 is a mixed-flow fan. However, it should be understood by one having ordinary skill in the art that the fan member 128 may also be formed to include both the first fan 144 as well as the second fan 48. The blower assembly 132 of the dedicated blower 110 remains removably attachable to the attachment shell 130 to allow the user to access the fan member 128 and other components for cleaning and general maintenance.

Figure 11A:
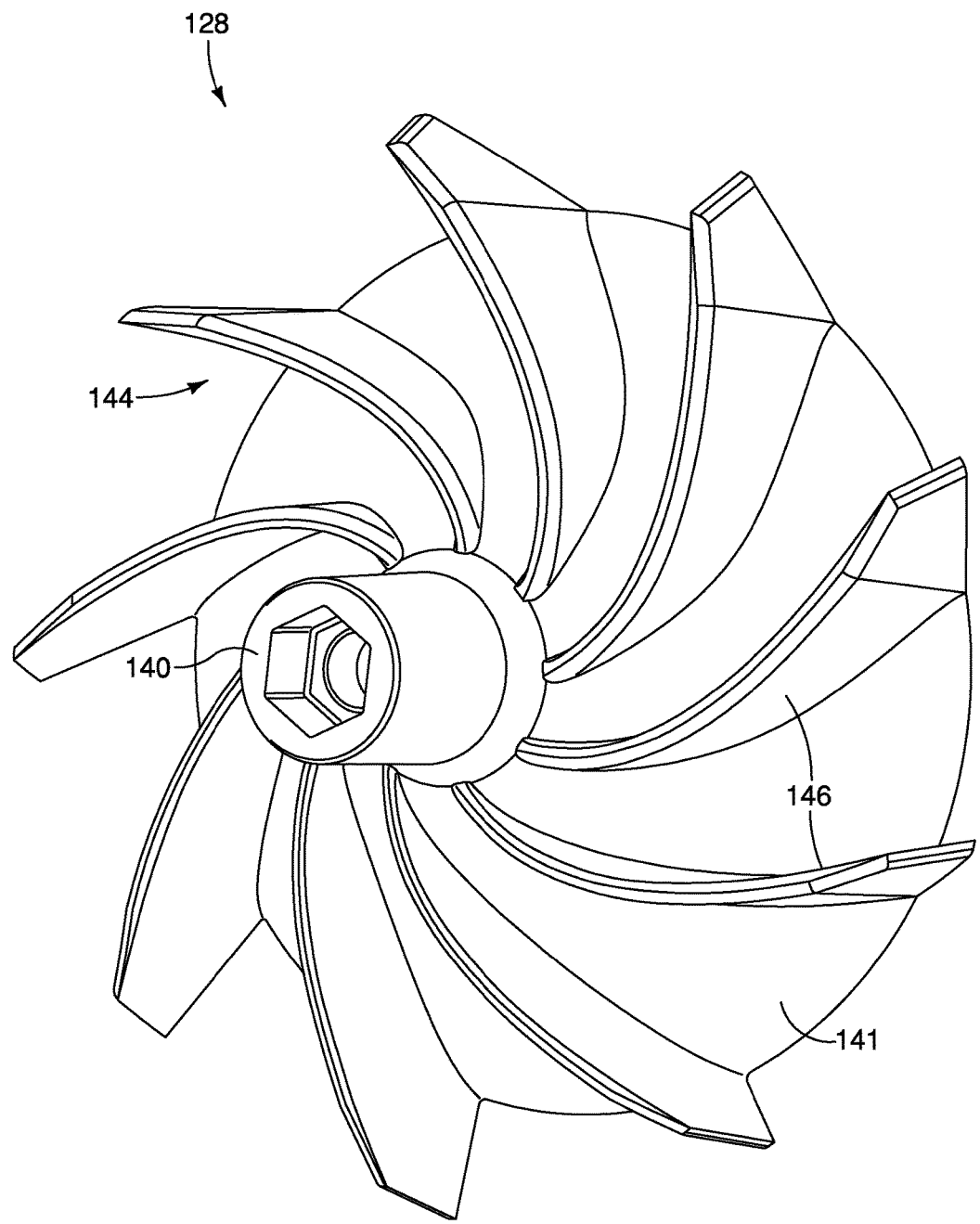
FIG. 11A is a perspective view of an embodiment of a fan member with a first fan.
Figure 11B:
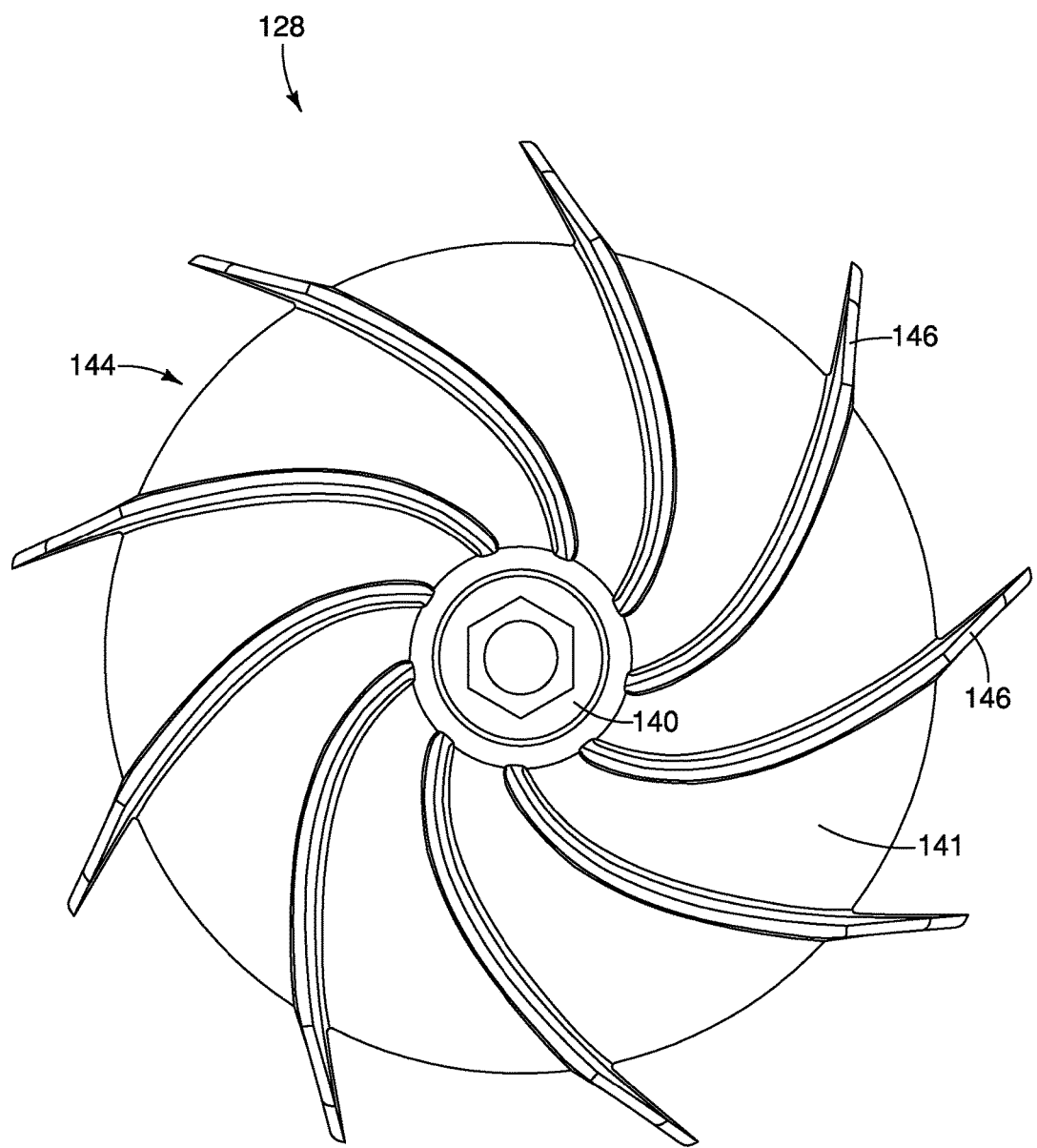
FIG. 11B is a front view of the fan member shown in FIG. 11A.
Figure 11C:
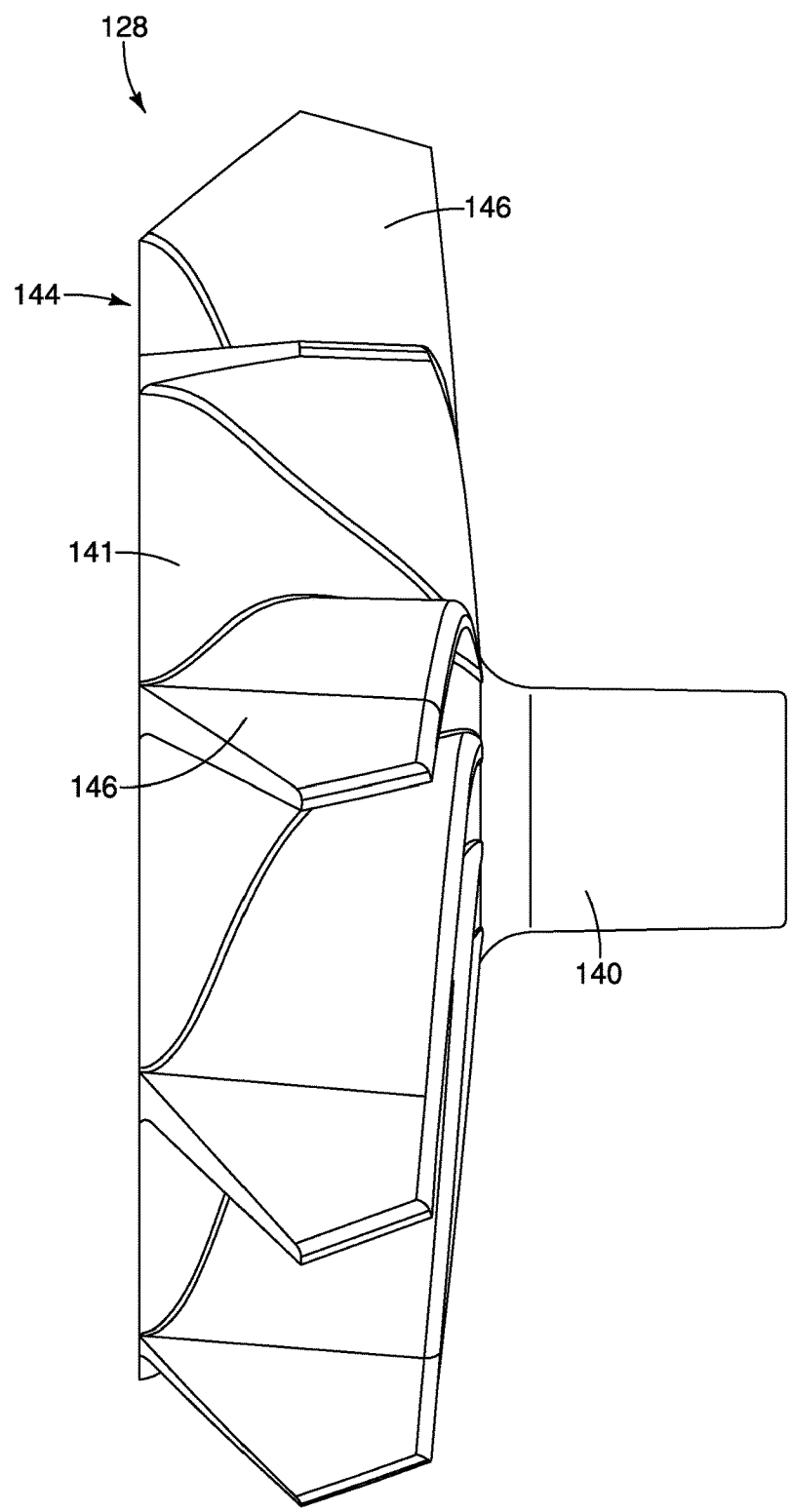
FIG. 11C is a side view of the fan member shown in FIG. 11A.

FIGS. 11A-11C illustrate an embodiment of the fan member 128 for a dedicated blower 110. The illustrated embodiment of the fan member 128 includes only the first fan 144, but it should be understood by one having ordinary skill in the art that a fan member 128 having both the first and second fan 144, 48 can be used. The first fan 144 is configured as a mixed-flow fan in which the first fan blades 146 extend radially outward from the base 140, wherein the first fan blades 146 extend outwardly beyond the circumferential outer edge of the frustoconical surface 141 in a cantilevered manner. In the illustrated exemplary embodiment, the first fan blades 146 are angled or curved relative to the central hub 140. In other words, the first fan blades 146 do not extend radially outward from the central hub 140 in a linear manner. As the first fan blades 146 extend from the central hub 140, the first fan blades 146 continually curve. In one embodiment, the curvature of the first fan blades 146 is in the direction of rotation when the fan member 128 is rotated. In another embodiment, the curvature of the first fan blades 146 is in the opposite direction of rotation when the fan member 128 is rotated. In addition to the curvature of the first fan blades 146 in the radial direction, the first fan blades 146 are also angled with respect to the frustoconical surface 141. It should be understood by one having ordinary skill in the art that the first fan blades 146 can be planar, curved, a combination thereof, or have any shape sufficient to provide increased air flow resulting from the rotation of the fan member 128, wherein the air flow generated by the first fan blades 146 is substantially parallel to the drive shaft 26 (FIG. 5).

The dedicated vacuum 210, as shown in FIG. 10, includes substantially the same components as the blower/vacuum 10, such as a base 212, a drive shaft (not shown), an attachment shell 230, and a vacuum assembly 234. The fan member 228 of the dedicated vacuum 210 includes only the second fan 248 but not the first fan 44 (FIG. 6), because the first fan 44 would never be utilized in the dedicated vacuum 210. However, it should be understood by one having ordinary skill in the art that the fan member 228 may also be formed to include both the first fan 44 as well as the second fan 248. The vacuum assembly 234 of the dedicated vacuum 210 remains removably attached to the attachment shell 230 to allow the user to access the fan member 228 and other components for cleaning and general maintenance.

While preferred embodiments of the present invention have been described, it should be understood that the present invention is not so limited and modifications may be made without departing from the present invention. The scope of the present invention is defined by the appended claims, and all devices, processes, and methods that come within the meaning of the claims, either literally or by equivalence, are intended to be embraced therein.

What is claimed is:

1. A blower that includes a base having a housing, a handle extending from said housing, a power source positioned within said housing, said blower comprising:
    a drive shaft extending forwardly from said power source, wherein said drive shaft is rotatable by said power source;
    a fan member operatively connected to said drive shaft, said fan member includes an axial fan;
    a flywheel extending rearwardly from said power source, said flywheel being positioned adjacent to a rear of said housing; and
    at least one rear vent formed into said rear of said housing adjacent to said flywheel;
    wherein rotation of said flywheel draws ambient air into said housing through said at least one rear vent, and rotation of said flywheel generates a cooling air flow that directs said ambient air across said power source to cool said power source during operation thereof.

2. The blower of claim 1, wherein said flywheel includes a plurality of fan vanes.

3. The blower of claim 1, wherein said cooling air flow is further directed toward said fan member to increase air flow velocity produced by said fan member.

4. The blower of claim 1, said at least one rear vent including a plurality of rear vents, wherein air is drawn into said housing through said plurality of rear vents.

5. The blower of claim 1 further comprising a plurality of side vent formed into said housing and positioned between said power source and said fan member.

6. The blower of claim 5, wherein rotation of said fan member draws ambient air into said housing through said plurality of side vents.

7. The blower of claim 6, wherein said cooling air flow from said flywheel mixes with said ambient air entering through said side vents to increase a velocity of air flow generated by said fan member.

8. A blower that includes a base having a housing, a handle extending from said housing, a power source positioned within said housing, said blower comprising:
    a drive shaft extending forwardly from said power source, wherein said power source selectively rotates said drive shaft;
    a fan member operatively connected to said drive shaft, wherein said fan member includes an axial fan;
    a starter assembly positioned adjacent to a rear of said housing;
    a flywheel extending rearwardly from said power source, said flywheel being positioned between said power source and said starter assembly; and
    at least one rear vent formed into said rear of said housing;
    wherein rotation of said flywheel draws ambient air into said housing through said at least one rear vent, and rotation of said flywheel generates a cooling air flow that directs said ambient air across said power source to cool said power source during operation thereof.

9. The blower of claim 8, wherein said cooling air flow is further directed toward said fan member to increase air flow velocity produced by said fan member.

10. The blower of claim 8, said at least one rear vent including a plurality of rear vents, wherein air is drawn into said housing through said plurality of rear vents.

11. The blower of claim 8 further comprising a plurality of side vent formed into said housing and positioned between said power source and said fan member.

12. The blower of claim 11, wherein rotation of said fan member draws ambient air into said housing through said plurality of side vents.

13. The blower of claim 12, wherein said cooling air flow from said flywheel mixes with said ambient air entering through said side vents to increase a velocity of air flow generated by said fan member.

14. A blower comprising:
    a base having a handle, a housing, and power source positioned within said housing, said power source having a drive shaft extending forwardly therefrom, wherein said power source selectively rotates said drive shaft;
    a starter assembly positioned adjacent to a rear of said housing;
    a flywheel positioned between said starter assembly and said power source;

a fan member having a first fan formed on one side thereof and a second fan formed on an opposing side thereof, said fan member being rotatably driven by said drive shaft;

a rear vent formed into a rear of said housing, wherein rotation of said flywheel draws ambient air into said housing through said rear vent;

a plurality of side vents formed into said housing and positioned between said power source and said fan member;

wherein rotation of said fan member draws ambient air into said housing through said plurality of side vents;

wherein rotation of said flywheel draws ambient air into said housing through said at least one rear vent, and rotation of said flywheel generates a cooling air flow that directs said ambient air across said power source to cool said power source during operation thereof;

wherein said cooling air flow from said flywheel mixes with said ambient air entering through said side vents to increase a velocity of air flow generated by said fan member.

\* \* \* \* \*